(12) United States Patent
Zhi et al.

(10) Patent No.: US 11,362,367 B2
(45) Date of Patent: Jun. 14, 2022

(54) ELECTRICAL ENERGY STORAGE DEVICE AND A METHOD OF PREPARING THE SAME

(71) Applicant: City University of Hong Kong, Kowloon (HK)

(72) Inventors: Chunyi Zhi, Shatin (HK); Zhuoxin Liu, Kowloon Tong (HK); Hongfei Li, Kowloon Tong (HK); Zijie Tang, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 240 days.

(21) Appl. No.: 16/383,927

(22) Filed: Apr. 15, 2019

(65) Prior Publication Data
US 2020/0328477 A1    Oct. 15, 2020

(51) Int. Cl.
| | |
|---|---|
| *H01M 10/0565* | (2010.01) |
| *H01M 4/24* | (2006.01) |
| *H01G 11/56* | (2013.01) |
| *H01M 4/50* | (2010.01) |
| *H01M 4/505* | (2010.01) |
| *H01M 4/04* | (2006.01) |
| *H01M 4/66* | (2006.01) |
| *H01M 10/36* | (2010.01) |

(52) U.S. Cl.
CPC ........ *H01M 10/0565* (2013.01); *H01G 11/56* (2013.01); *H01M 4/0404* (2013.01); *H01M 4/0438* (2013.01); *H01M 4/244* (2013.01); *H01M 4/50* (2013.01); *H01M 4/505* (2013.01); *H01M 4/661* (2013.01); *H01M 4/663* (2013.01); *H01M 4/669* (2013.01); *H01M 10/36* (2013.01)

(58) Field of Classification Search
None
See application file for complete search history.

(56) References Cited

U.S. PATENT DOCUMENTS

2019/0070826 A1*   3/2019   Zhao .................. B32B 3/30

FOREIGN PATENT DOCUMENTS

| CN | 104530311 | 5/2016 |
|---|---|---|
| WO | 2016106171 | 6/2016 |

OTHER PUBLICATIONS

Liu, Yongchuan, et al. "Layered-MnO2 nanosheet grown on nitrogen-doped graphene template as a composite cathode for flexible solid-state asymmetric supercapacitor." ACS applied materials & interfaces 8.8 (2016): pp. 5251-5260.*

(Continued)

*Primary Examiner* — Laura Weiner
(74) *Attorney, Agent, or Firm* — Renner Kenner Greive Bobak Taylor & Weber

(57) ABSTRACT

An electrical energy storage device and a method of forming such electrical energy storage device. The electrical energy storage device includes an electrolyte that is arranged to dissipate energy when subjected to external mechanical load applied to the electrical energy storage device. The electrolyte includes a polymer matrix of at least two crosslinked structures, including a first polymeric material and a second polymeric material; and an electrolytic solution retained by the polymer matrix.

12 Claims, 35 Drawing Sheets

(56) References Cited

OTHER PUBLICATIONS

Liu, Lingyang, et al. "A moisture absorbing gel electrolyte enables aqueous and flexible supercapacitors operating at high temperatures." Journal of Materials Chemistry A 7.35 (2019): pp. 20398-20404.*

Zhang, Panpan, et al. "Zn-ion hybrid micro-supercapacitors with ultrahigh areal energy density and long-term durability." Advanced Materials 31.3 (2018): 1806005.*

M. Song, et al, "Recent Advances in Zn-Ion Batteries", Advance Function Materials, 2018, 28, 1802564.

H. Li, et al, "An Extremely Safe and Wearable Solid-State Zinc Ion Battery Based on a Hierarchical Structured Polymer Electrolyte", Energy Environmental Science 2018, 11, 941-951.

H. Pan, et al, "Reversible Aqueous Zinc/Manganese Oxide Energy Storage from Conversion Reactions", Nature Energy, 2016, 1, 16039.

Sun, J.-Y, et al, "Highly Stretchable and Tough Hydrogels", Nature 2012, 489, 133-136.

Luo, F, et al, "Oppositely Charged Polyelectrolytes Form Tough, Self-Healing, and Rebuildable Hydrogels", Advance Materials, 2015, 27, 2722-2727.

* cited by examiner

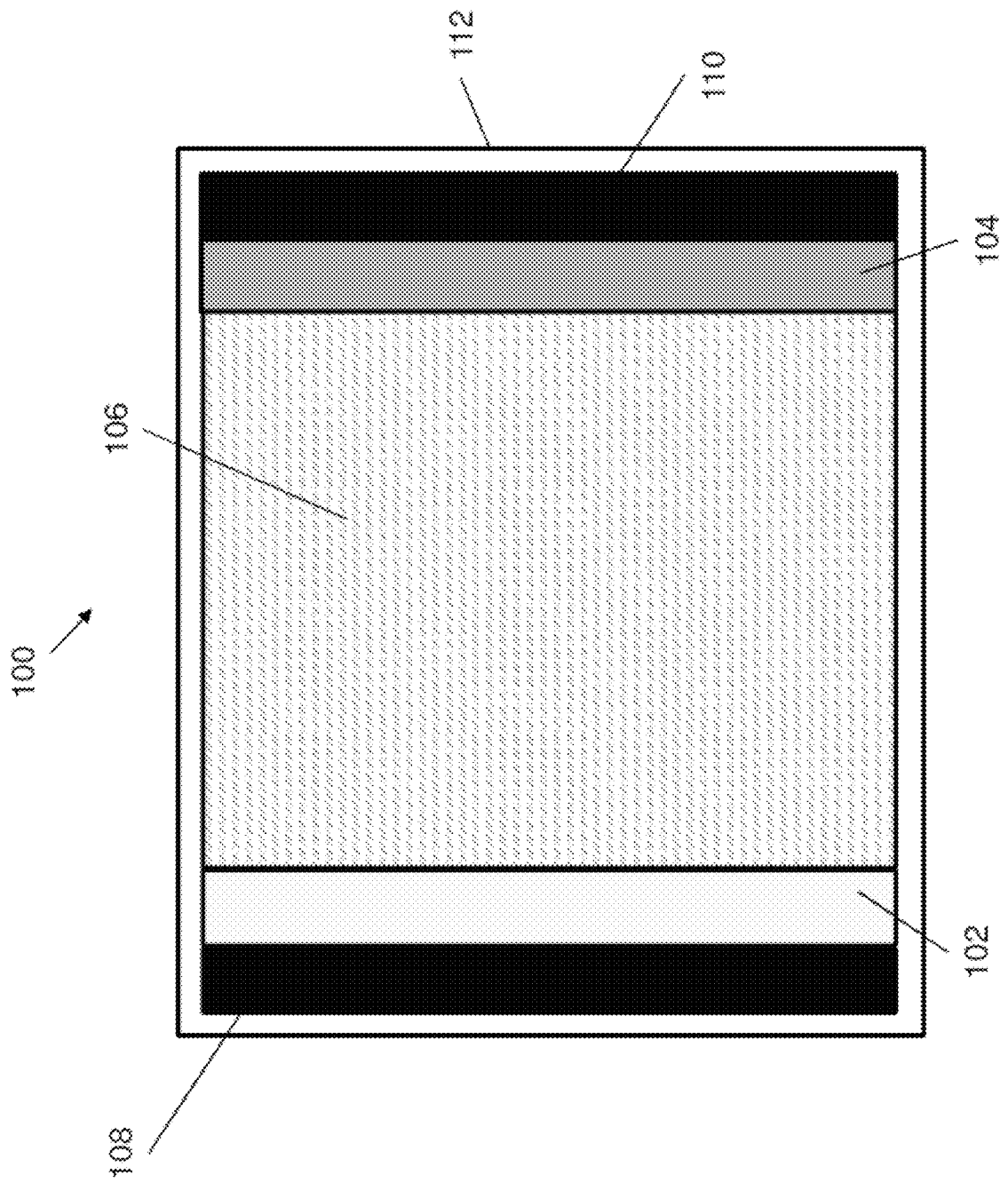

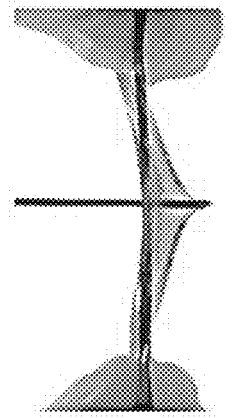
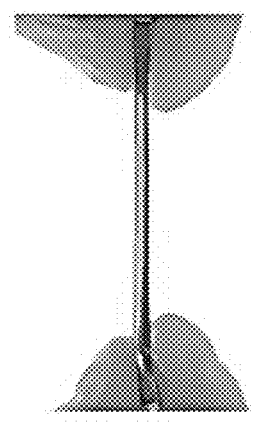
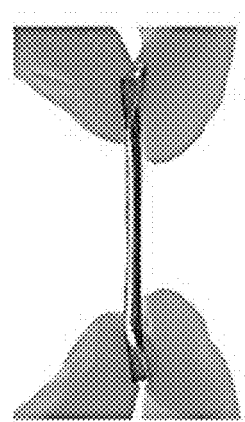
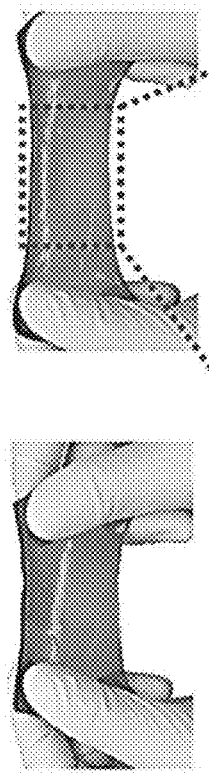
Fig. 9D
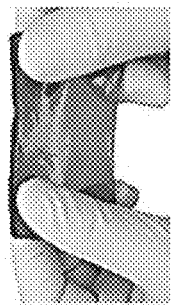
Fig. 9E

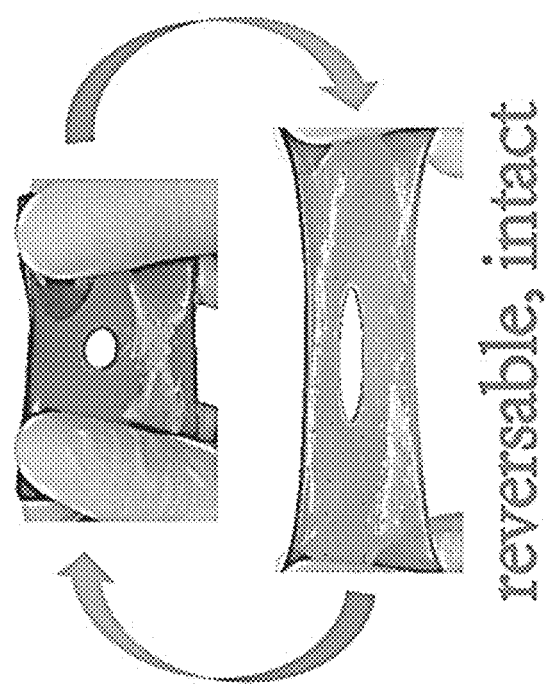
reversable, intact
Fig. 9F
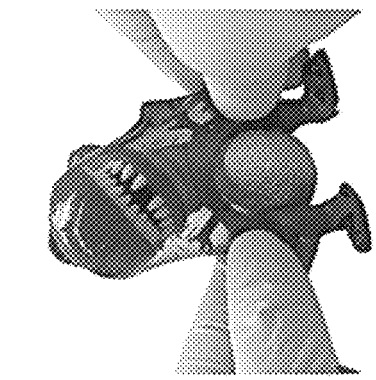
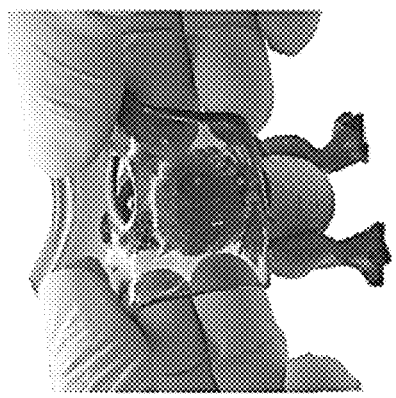
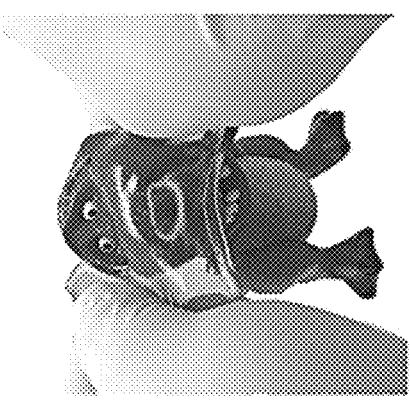
Fig. 9G

ELECTRICAL ENERGY STORAGE DEVICE AND A METHOD OF PREPARING THE SAME

TECHNICAL FIELD

The present invention relates to an electrical energy storage device and a method of preparing the same, in particular, but not exclusively, to an electrical energy storage device that can dissipate mechanical energy upon subjecting to an external mechanical load.

BACKGROUND

Flexible and wearable devices are growing in use and are starting to become more main stream. Flexible and wearable devices are being incorporated into wearable products that are also starting to become more popular and are starting to gain wider usage.

A wearable energy source is a requirement for any wearable device. Wearable energy source devices have attracted tremendous attention due to the rapid development of wearable electronics. Examples of wearable power source may include supercapacitors or some particular batteries.

SUMMARY OF THE INVENTION

In accordance with the first aspect of the present invention, there is provided an electrical energy storage device, comprising: a first electrode and a second electrode, the first and the second electrode being spaced apart from each other; an electrolyte disposed between the first electrode and the second electrode, the electrolyte comprises a polymer matrix including at least two crosslinked structures having a first polymeric material and a second polymeric material; and an electrolytic solution retained by the polymer matrix; wherein the electrolyte is arranged to dissipate mechanical energy when subjected to an external mechanical load applied to the electrical energy storage device.

In an embodiment of the first aspect, the at least two crosslinked structures are defined by a plurality of polymer chains of the first polymeric material that form a chemical crosslink between each adjacent pair of polymer chains of the first polymeric material.

In an embodiment of the first aspect, the chemical crosslink includes at least one covalent bond formed at a bonding site between the adjacent pair of polymer chains of the first polymeric material.

In an embodiment of the first aspect, the chemical crosslink further includes a crosslinking agent forming the at least one covalent bond with the adjacent pair of polymer chains of the first polymeric material.

In an embodiment of the first aspect, the crosslinking agent is N,N'-methylenebisacrylamide.

In an embodiment of the first aspect, the at least two crosslinked structures include a second crosslinked structure defined by a plurality of polymer chains of the second polymeric material that form a ionic crosslink between at least one adjacent polymer chain of the second polymeric material.

In an embodiment of the first aspect, the ionic crosslink includes at least one ionic bond formed at a bonding site between the adjacent pair of polymer chains of the second polymeric material.

In an embodiment of the first aspect, the ionic crosslink further includes a crosslinking agent forming the at least one ionic bond with the adjacent pair of polymer chains of the second polymeric material.

In an embodiment of the first aspect, the crosslinking agent includes a cation, such as $Ca^{2+}$, $Mg^{2+}$, $Zn^{2+}$, $Al^{3+}$, $Mn^{2+}$ or $Fe^{2+}$.

In an embodiment of the first aspect, the at least two crosslinked structures include a third crosslinked structure including at least one physical crosslink formed between adjacent pairs of polymer chains of the first and the second polymeric materials.

In an embodiment of the first aspect, the physical crosslink includes intercrossing and intertwining connections between adjacent polymer chains of the first polymeric material and the second polymeric material.

In an embodiment of the first aspect, the first polymeric material is polyacrylamide.

In an embodiment of the first aspect, the second polymeric material is alginate.

In an embodiment of the first aspect, the first electrode is an anode including a substrate deposited with zinc metal.

In an embodiment of the first aspect, the second electrode is a cathode including a substrate deposited with an active material.

In an embodiment of the first aspect, the substrate is selected from the group consisting of carbon nanotube paper, carbon cloth, carbon paper, nickel foam, and steel sheet.

In an embodiment of the first aspect, the active material includes $\alpha\text{-}MnO_2$.

In an embodiment of the first aspect, the electrolytic solution includes at least one salt or acid having a concentration of 0.1-3 M.

In an embodiment of the first aspect, the energy storage device further includes at least one protective layer being disposed on the rear side of each electrode, that is opposite to the electrolyte.

In an embodiment of the first aspect, the protective layer includes a polymeric layer.

In an embodiment of the first aspect, the polymeric layer includes at least the first and the second polymeric materials.

In an embodiment of the first aspect, the amount of the first polymeric material is 5-20% by weight of the total amount of the electrolyte.

In an embodiment of the first aspect, the amount of the second polymeric material is 0.5-5% by weight of the total amount of the electrolyte.

In an embodiment of the first aspect, the covalently crosslinked structure dissipates energy by elastic deformation when subjected to external mechanical load thereby maintaining the integrity of the electrolyte.

In an embodiment of the first aspect, the ionically crosslinked structure dissipates energy by rupturing bonds within the structure when subjected to external mechanical load; and restoring the bonds when the external mechanical load is removed.

In an embodiment of the first aspect, the energy storage device is a rechargeable battery.

In accordance with the second aspect of the present invention, there is provided a method of forming an energy storage device, comprising the steps of: forming a first electrode; forming a second electrode; forming an electrolyte; and sandwiching the electrolyte between the first electrode and the second electrode; wherein the electrolyte is arranged to dissipate energy when subjected to an external mechanical load applied to the energy storage device.

In an embodiment of the second aspect, the method further includes the step of disposing at least one protective layer on the rear side of each electrode that is opposite to the electrolyte.

In an embodiment of the second aspect, the step of forming the first electrode includes a step of electrodepositing a metal on a substrate for 10-100 min.

In an embodiment of the second aspect, the step of forming the second electrode includes a step of depositing an active material on a substrate.

In an embodiment of the second aspect, the active material is obtained by a hydrothermal process, for a time of 2-30 h and at a temperature of 100-250° C.

In an embodiment of the second aspect, the step of forming the electrolyte includes the steps of: forming a mixture of a first gel monomer, an initiator and a crosslinking agent; adding an alginate into the mixture to form a blend; curing the blend at room temperature or a higher temperature; and soaking the cured blend in an aqueous electrolytic solution.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 1A illustrates of an electrical energy storage device in accordance with an embodiment of the present invention.

FIG. 1B illustrates a further configuration of the energy storage device of FIG. 1a.

FIG. 9D is a series of optical images showing a stretched Zn-alginate/PAAm hydrogel being poked with a sharp needle.

FIG. 9E is a series of optical images showing a Zn-alginate/PAAm hydrogel with numerous tiny through-holes being stretched.

FIG. 9F is an optical image showing a Zn-alginate/PAAm hydrogel with numerous tiny through-holes and a large through-hole being reversibly stretched.

FIG. 9G is a series of optical images showing an irregular toy statue being wrapped with the Zn-alginate/PAAm hydrogel of FIG. 9F.

DETAILED DESCRIPTION OF THE PREFERRED EMBODIMENTS

Figure 1B:
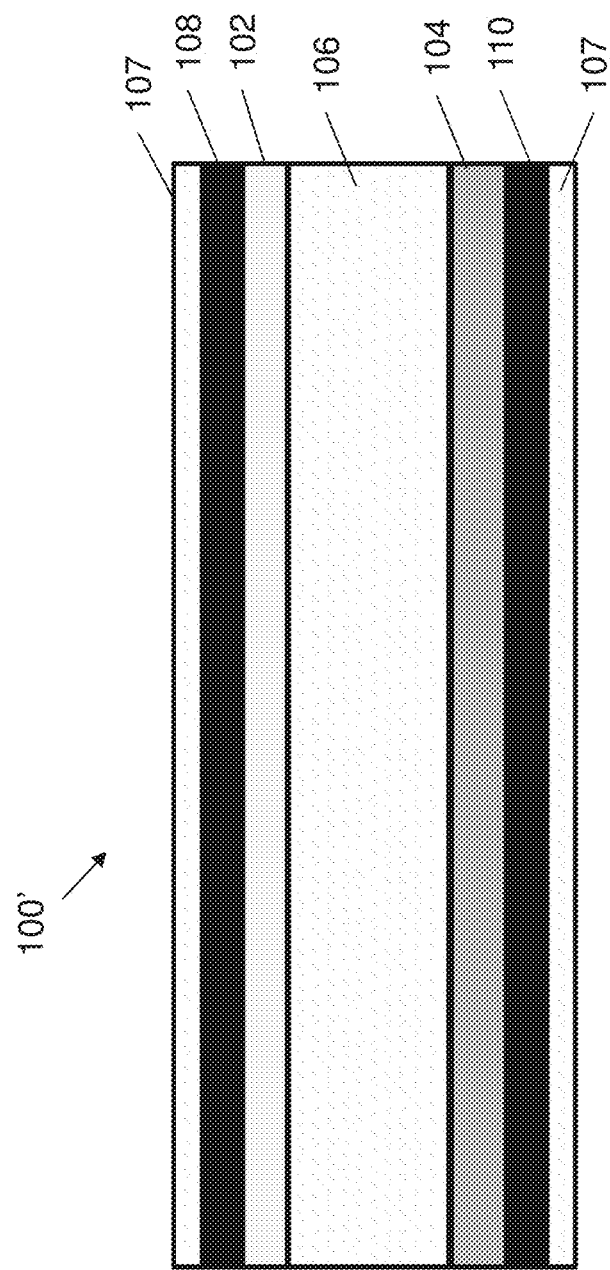

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-manganese oxide (Zn—$MnO_2$) battery which may include advantages such as having much less toxic and flammable materials therein as compared with lithium-ion batteries, therefore may have much less safety and/or health concern to users. Zn—$MnO_2$ batteries may also be low cost for scaling up as a result of the water-free and/or oxygen-free environment for assembling the battery. In addition, Zn—$MnO_2$ batteries may have high power energy with an excellent cycling stability, therefore may be used in long-lasting power systems.

It is appreciated that human bodies and organs are soft, curved, and constantly moving, flexible and wearable devices will therefore experience various mechanical forces during routine use, including forces from, for example, stretching, folding, hitting, shearing etc. The device sometimes may even experience accidentally cutting and/or scratching during use. In other words, the device will experience various mechanical forces simultaneously (i.e. dynamic mechanical stimuli) during routine use. As such, any devices that are not strong enough to endure severe mechanical stimuli, their electronic components (e.g. electrodes and electrolyte) may separate and/or detach from each other, and thereby deteriorating the electrical performance of the device.

In addition, the inventors have, through their own research, trials, and experiments, devised that many of the flexible energy storage devices may be merely able to endure static bending at certain angles while their performance is easily affected by dynamic and/or vast mechanical deformations. Thus, it may be preferable to provide an energy storage device with stable electrochemical performance while subjecting to various dynamic mechanical stimuli (e.g. cutting, folding, pressing, squeezing, twisting, hammering, etc.).

In accordance with an example embodiment of the present invention, there is provided an energy storage device with excellent flexibility/softness and mechanical stimuli resistance. The device may be capable of enduring severe mechanical stimuli including squeezing, compressing, twisting, cutting, hammering, treading, and car run-over. In particular, the device may include a highly flexible electrolyte that is arranged to dissipate mechanical energy applied onto the device when it is subjected to external mechanical loads, and therefore enhancing the mechanical stability and durability of the device.

With reference to FIG. 1A, there is shown an exemplary embodiment of an electrical energy storage device 100. The energy storage device 100 may be of any form that can capture energy produced at one time for use at a later time. In this example, the electrical energy storage device is a battery, in particular a rechargeable battery. The battery 100 may be of any suitable form that fits a particular application, such as flat-shaped, fiber-shaped, twisted fiber-shaped, coin-shaped, ball-shaped etc. Regardless of the shape of the battery, the battery may be substantially arranged to physically deform and dissipate electrical energy upon subjecting to external mechanical loads while maintaining the electrochemical performance.

In this embodiment, the battery 100 comprises a first electrode 102 and a second electrode 104 being spaced apart from each other and an electrolyte 106 disposed between the first electrode 102 and the second electrode 104. An electrolyte 106 is sandwiched between and is electrically coupled with the first electrode 102 and the second electrode 104.

Optionally, the battery 100 may also include substrates 108, 110 which may provide mechanical supports to the anode and/or the cathode electrodes 102, 104. The substrates may also operate as a current collector to associate with the first electrode 102 and the second electrode 104 respectively. For example, the substrates may be electrically conductive and may be bonded to external electrical wires to deliver electrical energy to external electronic devices.

The battery 100 may optionally include an encapsulation 112 that that receives and encases the first electrode 102, second electrode 104 and the electrolyte 106. The encapsulation 112 may be formed in any suitable shape such as for example a cylinder or a planar shape or any other suitable shape. The encapsulation 112 may be formed from a suitable material such as epoxy or a polymer.

In one example embodiment, the first electrode 102 functions as an anode and the second electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement dependent on the desired shape of the battery 100.

With reference to FIG. 1A, the first electrode 102 (i.e. anode) comprises a substrate 108 with a metal or metal compound disposed on the substrate 108. The substrate 108 may be any suitable material. In one example the substrate 108 is a carbon nanotube (CNT) paper. Alternatively the substrate 108 may be selected from carbon cloth, carbon paper, nickel foam or steel sheet. The substrate 108 may have some electrical conductance but is preferably robust enough to function within an electrolyte.

The anode 102 preferably comprises a zinc sheet, further preferably comprises a zinc nanosheet that is electrodeposited onto carbon nanotube (CNT) paper 108. The CNT paper 108 provides a base layer for the zinc to be deposited onto. In particular, the CNT paper 108 may have a rough surface with interwined structures which in turn facilitating the deposition of materials thereon. The zinc is deposited to form a substantially thick layer of zinc. The thickness may depend on the operational life of the battery 100. In one example, the electrodeposited zinc may be highly crystalline and uniformly cover the entire surface of the CNT paper. In particular, the electrodeposited zinc may have a highly porous architecture comprising interconnected nanoflakes. This may be advantageous as the nanocrystalline and porous structure may reduce ion diffusion path which in turn facilitating electrolyte penetration as well as charge/ion transport.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100.

The second electrode 104 (i.e. cathode) comprises a substrate 110 with an active material disposed on the substrate. In one example, the substrate 110 may be similar in construction to the anode substrate 108. In another example the substrate 110 (i.e. cathode substrate 110) comprises a CNT paper. Alternatively the substrate may be a carbon cloth, carbon paper, nickel foam or steel sheet.

The active material comprises a metal oxide compound. Preferably the active material comprises $\alpha$-$MnO_2$. The active material (i.e. $\alpha$-$MnO_2$) may have a structure comprising a plurality of nanofibers of different lengths. The $\alpha$-$MnO_2$ nanorods may have a length of, for example, one to a few micrometres; and a diameter of, for example, 20-30 nm. These features may be advantageous as a shorter length may provide a small path and large surface area for electrolyte diffusion and therefore favouring energy storage.

Preferably, the electrolyte 106 may be a polymeric electrolyte disposed between the first electrode 102 and the second electrode 104. The polymeric electrolyte 106 may be a hydrogel electrolyte that is viscous enough to be formed into a shape and retain the shape it is formed into. For example, the electrolyte 106 may be formed into any one of an elongated shape, a planar shape, a tubular shape, a ball shape or any suitable shape. The electrolyte 106 is also capable of being retained within the battery 100 by being sandwiched between the electrodes 102 and 104. In other words, the electrodes 102 and 104 are disposed on opposite sides of the electrolyte 106.

The electrolyte 106 is arranged to dissipate mechanical energy when subjected to an external mechanical load applied to the battery 100, thereby allowing the battery 100 to maintain its electrochemical performance. For example, the battery 100 may physical deform into different irregular shapes under the conditions of bending, folding, squeezing, twisting, cutting, and hammering while dissipating energy therefrom, and maintaining the electrochemical performance. In one example, the electrolyte may be arranged to encapsulate the electrodes so as to further protect the electrodes from subjecting to external mechanical loads.

With reference to FIG. 1B, there is provided a further configuration of battery 100 (i.e. battery 100'). The battery 100' may have a similar configuration to the battery 100 in view of electrodes and electrolyte. The battery 100' may have a first electrode 102 acting as an anode and a second electrode 104 acting as a cathode being spaced apart from each other. Each of the electrodes 102, 104 may also include a substrate 108, 110 supporting the electrodes. The electrolyte 106 is sandwiched between the electrodes 102, 104.

The battery 100' may further include at least one protective layer that is at least partially covered the outer surfaces of the battery. In this example, the battery 100' may include two protective layers 107, each of which being disposed on the rear side of each electrodes 102, 104. In other words, the protective layers 107 are arranged to be opposite to the electrolyte 106, sandwiching the anode 102 and cathode 104 respectively. Alternatively, the protective layer may be arranged to encapsulate each of the electrodes and operatively connected with the electrolyte 106.

The protective layer 107, on the one hand, may function as an electrode protector by dissipating the energy applied thereonto. On the other hand, the protective layer 107 may synergistically work with the electrolyte 106 so as to dissipating the energy applied on the battery 100', maintaining the integrity and durability of the battery.

The protective layer 107 may be made of any suitable materials. In one example, the protective layer 107 may include a polymeric layer. The polymeric layer may be electrically conductive and may possess at least some degree of flexibility and mechanical resistance. In another example, the protective layer 107 may be a polymeric layer including at least a first polymeric and a second polymeric materials that constitute the electrolyte 106. In yet another example, the protective layer 107 may have the same composition as the electrolyte 106.

The protective layer 107 having similar or the same composition as the electrolyte may be advantageous as this may reduce the materials to be used and therefore simplifying the fabrication process as well as the fabrication costs.

Figure 2:
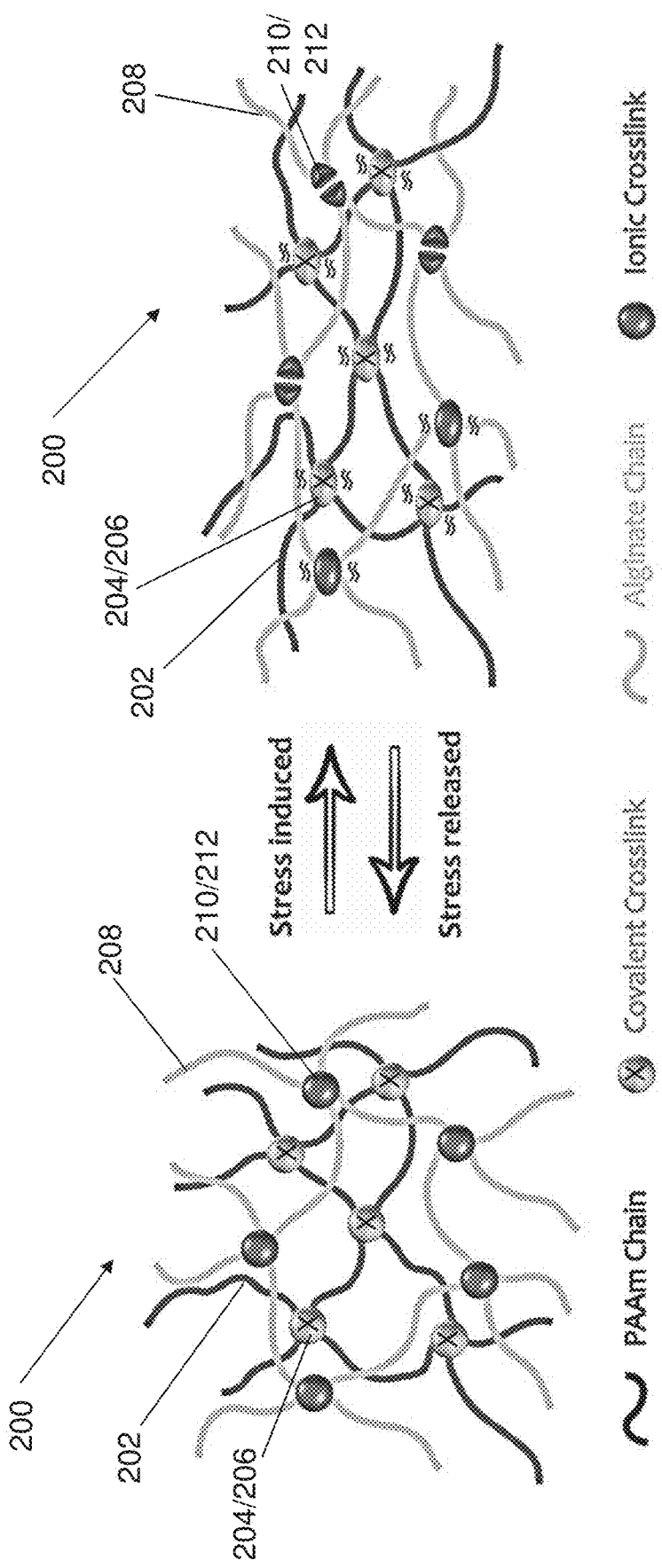
FIG. 2 illustrates the crosslinked structures within the electrolyte of the energy storage devices of FIGS. 1A and 1B with or without stress imposed thereon.

With reference to FIG. 2, the electrolyte 106 comprises a polymer matrix 200 including at least two crosslinked structures having a first polymeric material and a second polymeric material. In this example, the first and the second polymeric material are polyacrylamide (PAAm) and alginate respectively, which combine and form a hydrogel material that may have an interconnected porous structure and may be used as an electrolyte in a battery.

Preferably, the polymer matrix may include at least a first crosslinked structure and a second crosslinked structure. Each of the crosslinked structures may be defined by a plurality of polymer chains of the first or the second polymeric material. The polymer chains may interact with each other so as to allow the electrolyte to physically deform and dissipate mechanical energy upon subjecting to an external mechanical load applied to the polymer matrix.

Referring to FIG. 2, the first crosslinked structure is defined by a plurality of polymer chains of the first polymeric material 202 that form a chemical crosslink between each adjacent pair of polymer chains of the first polymeric material 202. The chemical crosslink may include at least one covalent bond that is formed in different ways. In one example, the chemical crosslink may include at least one covalent bond formed at a bonding site 204 between the adjacent pair of polymer chains of the first polymeric material 202.

For example, the chemical crosslink may include a first crosslinking agent 206, such as methylenebisacrylamide (MBAA) crosslinker, which forms at least one kind of covalent bonds with each of the adjacent pair of polymer chains of the first polymeric material 202 or PAAm. Preferably, the crosslinking agent may act as an anchor for bonding the adjacent pair of polymer chains of the first polymeric material together so as to strengthen the robustness of the structure. That is, the first crosslinked structure comprises a plurality polymer chains of the first polymeric material covalently bonded together via the first crosslinking agent 206.

In another example, the chemical crosslink may include at least one covalent bond formed directly between molecules in each of the polymer chains of the first polymeric material. For example, the adjacent pair of polymer chains of the first polymeric material 202 may be crosslinked by one or more covalent bonds formed directly between molecules in each of the polymer chains of the first polymeric material 202 at one or more bonding sites 204, or other suitable crosslinker may be used to form additional chemical crosslinks between the two adjacent polymer chains.

The second crosslinked structure is defined by a plurality of polymer chains of the second polymeric material 208 that form an ionic crosslink between each adjacent pair of polymer chains of the second polymeric material 208. The ionic crosslink may include at least one ionic bond formed at a bonding site 210 between the adjacent pair of polymer chains of the second polymeric material 208.

For example, the ionic crosslink may include a second crosslinking agent 212, which may include a cation selected from at least one of $Ca^{2+}$, $Mg^{2+}$, $Zn^{2+}$, $Al^{3+}$, $Mn^{2+}$ or $Fe^{2+}$. These divalent and/or trivalent ions form at least one ionic bond with each of the adjacent pair of polymer chains of the second polymeric material 208 or alginate. In other words, the ionic bond formed between each of the adjacent pair of polymer chains of the second polymeric material 208 or alginate may include a single type of cation and/or a combination of different types of cation. Preferably, the second crosslinking agent 212 may, on the one hand, partially act as an anchor for bonding the adjacent pair of polymer chains of the second polymeric material together so as to strengthen the robustness of the structure; on the other hand, the second crosslinking agent 212 may reversibly break down upon receiving external mechanical load/stress applied to the polymer matrix. That is, the second crosslinked structure comprises a plurality polymer chains of the second polymeric material ionically bonded together via the second crosslinking agent 212.

Optionally or additionally, the polymer matrix 200 may further include a third crosslinked structure, which may include at least one physical crosslink formed between adjacent pairs of polymer chains of the first polymeric material 202 and the second polymeric material 208. The physical crosslink, for example, may include any reversible crosslinking interaction known in the art such as chain entangling, hydrogen bond, hydrophobic interaction, crystallite formation, etc. Preferably, the physical crosslink includes an intertwining connection between the adjacent pair of polymer chains of the first polymeric material 202 and the second polymeric material 208. Together with the covalent crosslinking and ionic crosslinking as mentioned above, a synergetic effect may be achieved which renders the electrolyte strengthened mechanical robustness, flexibility as well as durability.

As mentioned above, the electrolyte 106 may be arranged to dissipate mechanical energy when subjecting to external mechanical loads applied thereonto. This may be accounted for by the interactions between the aforementioned crosslinked structures within the electrolyte. Referring to FIG. 2, when stress is induced within the polymer matrix 200, the covalently crosslinked structure of the first polymeric material 202 may elastically deform to disperse the energy among the whole structure. At the same time, the ionic bonds of the ionic crosslinked structure of the second polymeric material 208 may be ruptured such that any stress concentrated on the covalently crosslinked structure may be further alleviated.

In addition, the covalently crosslinked structure may physically crosslink with the ionic crosslinked structure. In this way, the covalently crosslinked structure may bridge the ionic crosslinked structure, which may maintain the shape of the electrolyte and prevent it from collapse when the covalently crosslinked structure deforms in response to the applied mechanical loads. In other words, the integrity of the electrolyte is maintained during the deformation.

When the stress is released, the covalently crosslinked structure may recover to its initial state whereas the ionic bonds of the ionic crosslinked structure may be restored. Therefore, the electrolyte is resumed to its original state.

The polymeric matrix 200 is arranged to retain an electrolytic solution therein for ion conductivity. The electrolytic solution may include at least one salt, in particular a metal salt, or an acid as additives within the electrolytic solution. In one example, the at least one salt or acid may further function as a crosslinking agent for the ionic crosslinked structure. Preferably, the electrolytic solution may include zinc (II) sulphate ($ZnSO_4$) and manganese (II) sulphate ($MnO_2$). A skilled person may recognize any other electrolytic solutions including suitable salts or acids according to their needs.

Referring to FIG. 2, there is shown an example structure of electrolyte 106 illustrating the crosslinked structures within the electrolyte. As mentioned above, the electrolyte 106 comprises a polymer matrix including at least two crosslinked structures. In this example, the polymer matrix includes a first crosslinked structure, a second crosslinked structure and a third crosslinked structure. Each of the crosslinked structures are defined by a plurality of polymer chains of polyacrylamide (PAAm) (i.e. the first polymeric material) or alginate (i.e. the second polymeric material).

The first crosslinked structure includes a plurality of PAAm chains crosslinked together by forming covalent bonds with a crosslinking agent such as N,N'-methylenebisacrylamide (MBAA) at a particular bonding site. In particular, the bonding site is where the reaction of the amide group of the PAAm chains and the amide groups of MBAA to occur. The MBAA may act as an anchor to bridge the PAAm chains and as a stress buffer center to dissipate mechanical energy and homogenize the PAAm structure.

The second crosslinked structure includes a plurality of alginate chains crosslinked together by forming ionic bonds with ionic crosslinking agents such as $Zn^{2+}$ and/or $Mn^{2+}$ in the electrolyte. The ionic bonds form when alginate is immersed in an electrolytic solution. Preferably, the bonding site is where the interaction between the guluronic acid units in different alginate chains and the ionic crosslinking agents such as $Zn^{2+}$ and/or $Mn^{2+}$ to occur, in which the negatively charged carboxyl group of the dissociated acid unit in each of the alginate chain forms ionic bonds with the cation. In addition, as alginate includes multiple guluronic acid units, therefore multiple alginate chains may be cross-linked together with such ionic linkages formed by the cations and the carboxyl groups in each of the alginate chains.

The ionic bonds may act as a reversible crosslinking point that can dynamically break/rupture and reform/restore to dissipate mechanical energy upon subjecting to external mechanical loads. As shown in FIG. 2, the alginate chains uniform disperse in the polymer matrix, physically connecting with the PAAm chains by for example intercrossing and intertwining, forming the third crosslinked structure.

As mentioned above, the covalent crosslinking and the ionic crosslinking may achieve a synergetic effect that renders the electrolyte excellent flexibility and effective mechanical energy dissipation, thereby strengthened mechanical resistance and durability. When stress is induced in the polymer matrix, the covalently crosslinked PAAm network (i.e. structure) may be deformed. The covalent bonds in the PAAm network may remain intact in response to the deformation thereby maintaining the shape and strength of the electrolyte. In other words, the covalent bonds may provide a framework for the PAAm upon deformation, preventing the electrolyte from collapse.

Meanwhile, the ionic bonds of the ionic crosslinked alginate network (i.e. structure) may break in response to the mechanical loads, which in turn dispersing the energy over a large area within the polymer matrix, facilitating energy dissipation. When the stress is released, the PAAm network may return to its original state whereas the ionic bonds of the alginate network may be reformed. As such, the original structure of electrolyte may be resumed.

This may be also advantageous as the electrolyte may show neglectable permanent deformation, thereby enhancing the durability of the electrolyte. In one example, the electrolyte 106 poked with a numerous tiny holes and a large hole may remain intact after several reversible stretching. In another example, a battery containing the electrolyte 106 may maintain its electrochemical performance after subjected to 20 times of random run-over by a car on road. Examples of flexibility and resistance to dynamic mechanical stimuli of the battery 100/100' or the polymer matrix 200 will be further discussed in the later parts of disclosure.

The polymer matrix 200 also includes a plurality of positive ions and negative ions within the matrix. These ions are obtained from the electrolytic solution including zinc (II) sulfate and manganese (II) sulfate retained by the polymer matrix. The positive ions ($Zn^{2+}$ and $Mn^{2+}$) and negative ions ($SO^{4-}$) may fill and move freely through the micropores of the electrolyte, thereby allowing the electrolyte being conductive. In addition, the positive ions ($Zn^{2+}$ and $Mn^{2+}$) may contribute to the ionic crosslinks in the second polymeric structure and may prevent cathode dissolution. Detailed example will be discussed in the later parts of disclosure. As appreciated by a person skilled in the art, chemical ions of other combinations may be trapped in the hydrogel structure when a different electrolytic solution is retained in the polymer matrix.

Figure 3:
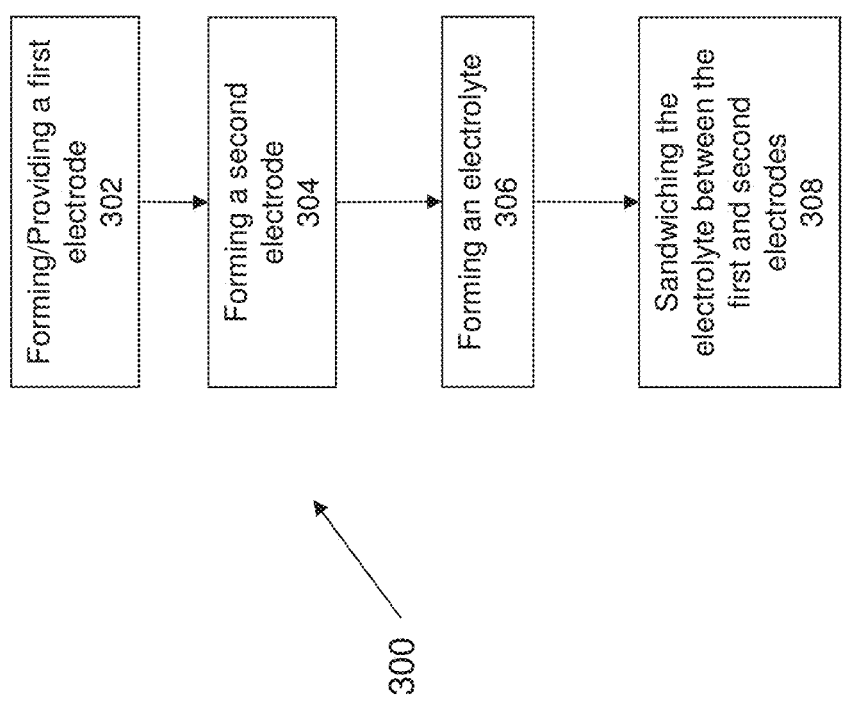
FIG. 3 shows an embodiment of a method of forming the energy storage devices of FIGS. 1A and 1B.

With reference to FIG. 3, there is shown a method 300 of forming an energy storage device that comprises the aforementioned electrolyte. The method 300 is a generalized method of forming a rechargeable battery that includes the aforementioned electrolyte and has a strengthened mechanical resistance, flexibility, and durability.

The method commences at step 302. Step 302 comprises forming or providing a first electrode. The first electrode may be an anode that is formed by depositing a zinc metal onto a substrate. The substrate is preferably a carbon nanotube (CNT) paper. Alternatively the substrate may be selected from carbon cloth, carbon paper, nickel foam or steel sheet. The substrate provides a base layer for the zinc to be deposited onto. The zinc is deposited to form a substantially thick layer of zinc. The deposition time may depend on the thickness requirement, which may depend on the operational life of the battery. In one example, the deposition time may be 10-100 min.

In this example, the anode is fabricated by depositing zinc metal onto CNT paper. The deposition process is carried out in by electroplating zinc metal nanosheets onto a CNT paper in a two-electrode setup at room temperature. CNT paper is used as a working electrode, zinc foil (purity >99.5%, Aladdin Shanghai Co., Ltd) is used as both anode and counter electrode, 1M $ZnSO_4$ is used as electrolyte. The electroplating process is carried out at −0.8 V (vs. Zn) for 720 s using an electrochemical workstation.

Optionally or alternatively, the first electrode may comprise a ribbon or a sheet of zinc metal. That is, the first electrode may not include an additional substrate and may include a piece of zinc metal. The zinc metal may be a flexible ribbon or a flexible sheet of zinc metal such as a zinc spring.

After deposition, the resultant anode is washed with deionized water and subsequently dried at ambient environment.

Step 304 comprises forming a second electrode. The second electrode (i.e. cathode) comprises a substrate with an active material disposed on the substrate. The substrate is preferably a CNT paper. Alternatively the substrate may be a carbon paper, carbon cloth, nickel foam or steel sheet. The active material preferably includes $\alpha$-$MnO_2$ which may be prepared by any suitable method. In one example, the active material (i.e. $\alpha$-$MnO_2$) is obtained by a hydrothermal reaction for a time of 2-30 h and at a temperature of 100-250° C.

In this example, the active material $MnO_2$ nanorods are synthesized by a hydrothermal method. A solution of $MnO_2$/$H_2SO_4$ is formed by adding $MnSO_4.H_2O$ (3.24 mmol) (99%, Aladdin Shanghai Co., Ltd) and $H_2SO_4$ (12 mmol) (95%, EMSURE) to 360 ml of deionized water under magnetic stirring. The as-prepared $MnO_2$/$H_2SO_4$ solution is slowly added with $KMnO_4$ (24 mmol) dissolved in 80 ml of deionized water, forming a solution mixture. The solution mixture is stirred for 2 h at room temperature and then being transferred to a Teflon-lined autoclave and heated at 120° C. for 12 h. The resultant $MnO_2$ is collected and washed four times with water by centrifugation, and dried overnight at 40° C.

The cathode is prepared by blade-coating a mixture of as-synthesized $MnO_2$, a conductive material Ketjen black (KB), and a binder polyvinylidene fluoride (PVDF) in a mass ratio of 70:20:10 onto the CNT paper.

Step 306 comprises forming an electrolyte. The electrolyte may be formed using any suitable method. In this example, the electrolyte is a Zn-alginate/PAAm hydrogel. The electrolyte preferably is formed using the same steps as method 400 that will be described later.

Step 308 comprises sandwiching the electrolyte between the first electrode and the second electrode. The sandwiching process may depend on the shape of the battery. In one example, the battery is a flat-shaped battery. Optionally, the electrolyte may be first pre-stretched to a predetermined strain. Then the electrodes are directly attached or layered on each side of the electrolyte. In an alternative example, where the battery may be a fiber-shaped battery, the electrolyte may be coated or wrapped onto the anode, followed by coating or wrapping the cathode on the electrolyte. The coating process may be performed by any suitable methods.

Step 308 may further comprise a step of disposing at least one protective layer on the rear side of each electrode that is opposite to the electrolyte. As mentioned above, the protective layer may have a similar of the same composition as the electrolyte. In this example, the protective layers have the same composition as the electrolyte and they are coated or wrapped onto the electrodes using the same aforementioned method.

Figure 4:
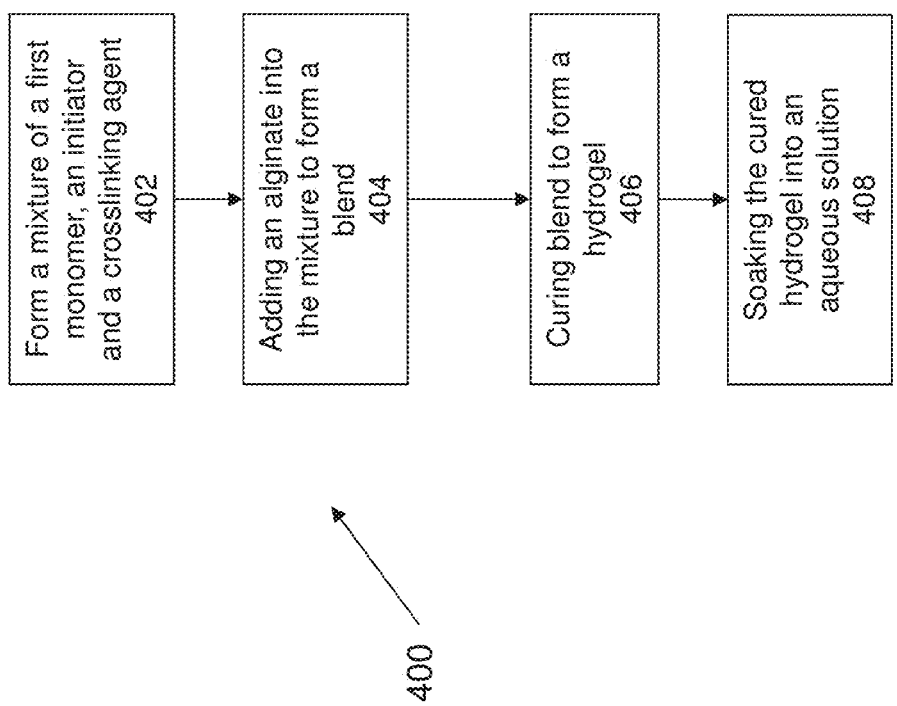
FIG. 4 shows an embodiment of a method of forming the hydrogel electrolyte in the energy storage devices of FIGS. 1A and 1B.

With reference to FIG. 4, there is shown an example of a method 400 of forming the electrolyte 106. The method commences at step 402. Step 402 comprises forming a mixture of a first gel monomer, an initiator and a crosslinking agent. In one example, the first gel monomer (i.e. the first polymer material) may be 5-20% by weight of the total amount of the electrolyte.

In this example where the electrolyte is a Zn-alginate/PAAm hydrogel, the first gel monomer is acrylamide monomer, the initiator is ammonium persulphate (APS) and the crosslinking agent is N,N'-methylenebisacrylamide (MBAA). The mixture is formed by dissolving 5.815 g of acrylamide monomer (99%, J&K Scientific), 28.6 mg of APS (>98%, Acros Organics) and 3.5 mg of MBAA (99%, Aladdin Shanghai Co., Ltd.) in 40 ml of deionized water under 30-min stirring at room temperature.

Step 404 comprises adding an alginate into the mixture to form a blend. In one example, the amount of alginate (i.e. the second polymeric material) may be 0.5-5% by weight of the total amount of the electrolyte. The blend may be degassed to remove any air bubbles therein, facilitating the subsequent curing process. In this example, 0.718 g of alginate (AR grade, Aladdin Shanghai, Co., Ltd.) is added to the as-obtained mixture under vigorous stirring until a clear blend solution. The solution is degassed for 10 min by ultrasonication.

At step 406, the blend obtained at step 404 is cured to form a hydrogel. The curing process may be performed at room temperature or a higher temperature to allow polymerization. The curing process may be carried in a glass mould. In this example, the degassed blend may be cured in a planar or column mold at a temperature of 60° C. for at least 10 h in order to allow polymerization of the PAAm chains. At this stage, the as-obtained hydrogel includes covalently crosslinked PAAm network with un-crosslinked alginate chains dispersed among the PAAm network. The as-prepared hydrogel may be peeled off and optionally dried under room temperature or an elevated temperature.

Finally, at step 408, the cured hydrogel is soaked into an aqueous electrolytic solution to promote ion conductivity of the electrolyte and the formation of the ionic crosslinked structure. In one example, the aqueous electrolytic solution may include at least one salt or acid having a concentration of 0.1-3 M.

In this example, the cured hydrogel may be soaked into an aqueous electrolytic solution containing zinc (II) sulphate at a concentration of for example 2M and manganese (II) sulphate at a concentration of for example 0.1M for 10-120 minutes at room temperature. This may allow ion exchange between the internal of hydrogel and the external solution. In addition, the ionic crosslinks may form between adjacent alginate chains through the interactions with $Zn^{2+}$ and/or $Mn^{2+}$ ions. Furthermore, any excess $Zn^{2+}$ and/or $Mn^{2+}$ ions mat contribute to ion transport for the electrolyte.

The characterization and performance of embodiments of the electrolyte and the energy storage device containing the electrolyte will now be discussed. Morphologies of materials were examined by using an environmental scanning electron microscope (ESEM, FEI/Philips XL30). Raman scattering spectra were obtained by using a Raman spectroscopy (WITec alpha300 access) with a laser at the wavelength of 532 nm and a grating of 600 g $mm^{-1}$. Structural and phase characterizations of materials were performed by using a powder XRD employing a Bruker D2 Phaser diffractometer with Cu Kα irradiation (λ=1.54 Å). Tensile tests and hysteresis loops of hydrogels were carried out by an HTS-LLY9130A tensile machine (Guangdong Zhongye Instrument Equipment Co., Ltd.). Bar samples of hydrogel were 50 mm long, 15 mm wide and 2 mm thick. Piston velocity was set to 100 mm $min^{-1}$ with the gauge length of 20 mm. Tensile modulus was derived from the slope of stress-strain curves in the strain range of 20%-60%.

The Galvanostatic charge/discharge measurements and cycle tests of batteries were carried out by a Land 2001A battery testing system. Cyclic voltammetry curves and electrochemical impedance spectroscopy in the frequency range of 0.01-$10^5$ Hz with a magnitude of 5 mV (at open circuit voltage) were obtained by an electrochemical workstation (CHI 760D). Ionic conductivity of hydrogel electrolytes was determined from electrochemical impedance spectra, with electrolyte sandwiched by two stainless steel sheets. The equation used for the calculation of ionic conductivity σ (mS $cm^{-1}$) is as below, $$\sigma = L/(R_b \cdot S) \times 1000$$

where L (cm) is the distance between the two stainless steel sheets, $R_b$ (Ω) is the bulk resistance (intercept at Z' axis), and S is the contact area ($cm^2$) between electrolyte and stainless steel sheet.

The fracture toughness of hydrogels was performed on a tensile machine. Two samples of the same hydrogel (25 mm×20 mm×2 mm) were pulled by a tensile machine, of which one sample was notched (notch length ≥½ sample with) while the other was intact. Curves of force vs. distance were thus obtained by pulling at the piston velocity of 100 mm $min^{-1}$, and the integrated area under the curve gives represents the work done by the applied force, U(L). Fracture energy was calculated from the equation below upon the notch started to turn into a running crack, $$\Gamma = \frac{U(L_c)}{a_0 \times b_0}$$

where U ($L_c$) is the integrated area under the force-length curve of the unnotched sample at the distance of $L_c$, and $L_c$ is the critical distance when the notched sample starts to turn into a running crack. $a_0$ and $b_0$ are the initial width and thickness of samples, respectively.

Figure 5:
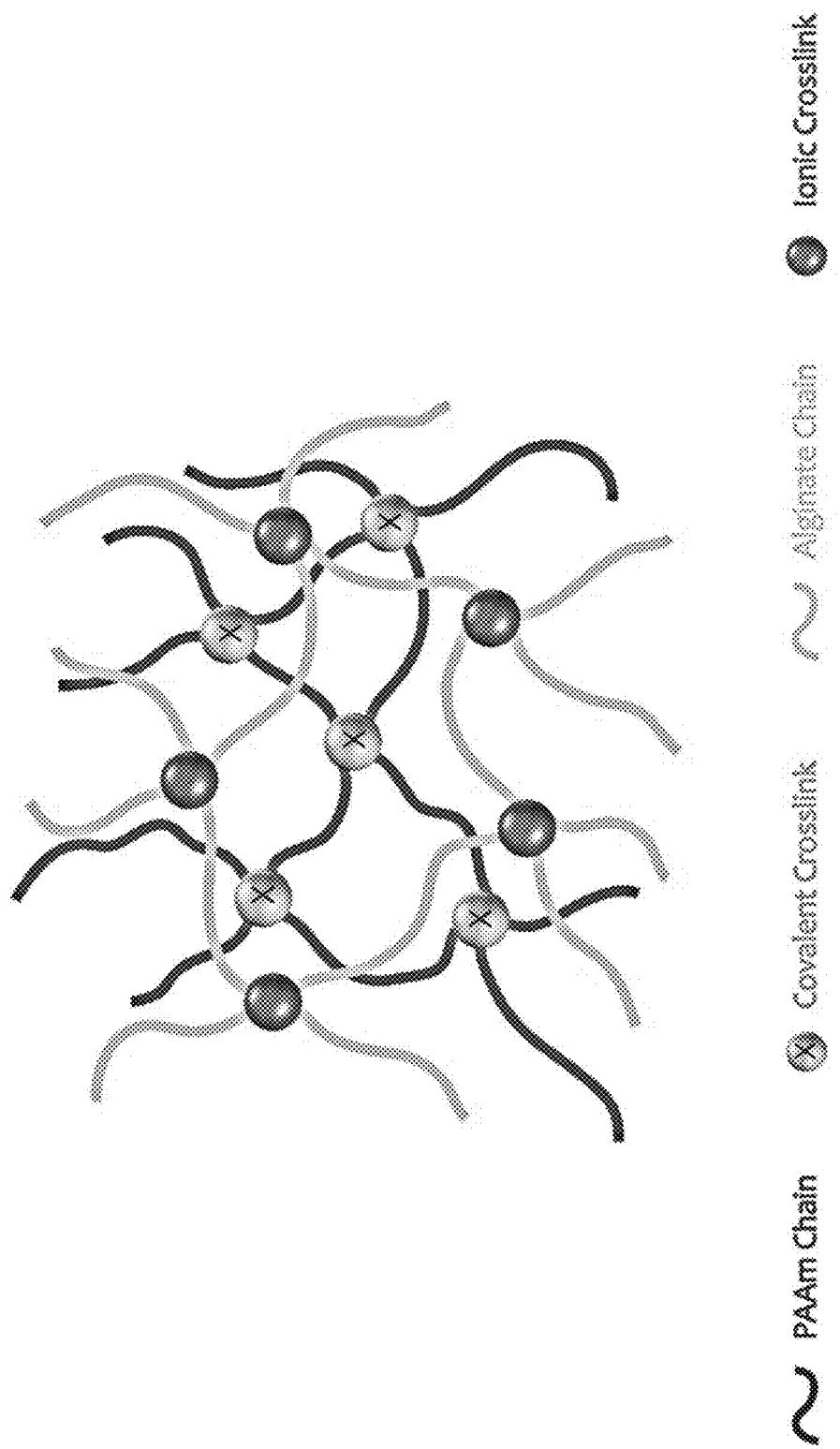
FIG. 5 illustrates the crosslinked structures of the Zn-alginate/PAAm hydrogel electrolyte.
Figure 6:
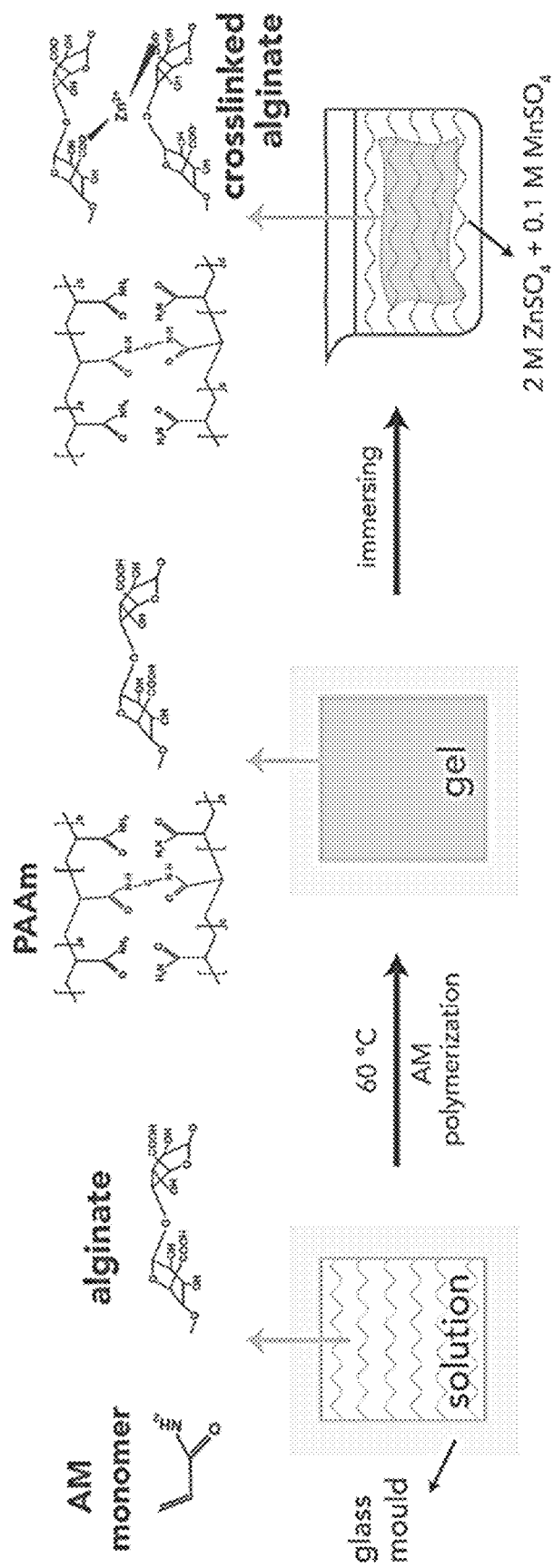
FIG. 6 is a schematic diagram showing the synthetic procedure of the Zn-alginate/PAAm hydrogel electrolyte.

With reference to FIGS. 5 and 6, there are shown a specific example of a Zn-alginate/PAAm electrolytle and the method of preparing the same. The preparation method is identical to the aforementioned method 400. As shown in FIG. 5, the Zn-alginate/PAAm hydrogel electrolyte consists of two crosslinked networks. Within the framework of the covalently crosslinked PAAm network, the alginate chains are ionically crosslinked by zinc ions, forming a second crosslinked network.

The Zn-alginate/PAAm electrolytl is prepared according to the scheme as shown in FIG. 6. The synthetic route involves the polymerization of acrylamide (AM) monomers induced by initiators and crosslinkers at 60° C. and the crosslinking of alginate chains by immersing the hydrogel in a solution of 2 M $ZnSO_4$+0.1 M $MnSO_4$, where the dissociated $Zn^{2+}$ ions form ionic crosslinks with the guluronic acid units in different alginate chains ($Mn^{2+}$ ions also participate in crosslinking, but $Zn^{2+}$ ions are in the majority, thus the resultant hydrogel is named Zn-alginate/PAAm).

Redundant zinc ions that do not participate in crosslinking with alginate chains contribute to the ionic conductivity for zinc-ion batteries. Thus, the used $Zn^{2+}$ ions provide dual functions, i.e., crosslinking and ion transporting, no extra crosslinking agent is needed. The addition of $Mn^{2+}$ ions can help suppress the dissolution of $Mn^{2+}$ from cathode into the electrolyte during electrochemical process.

Figure 7:
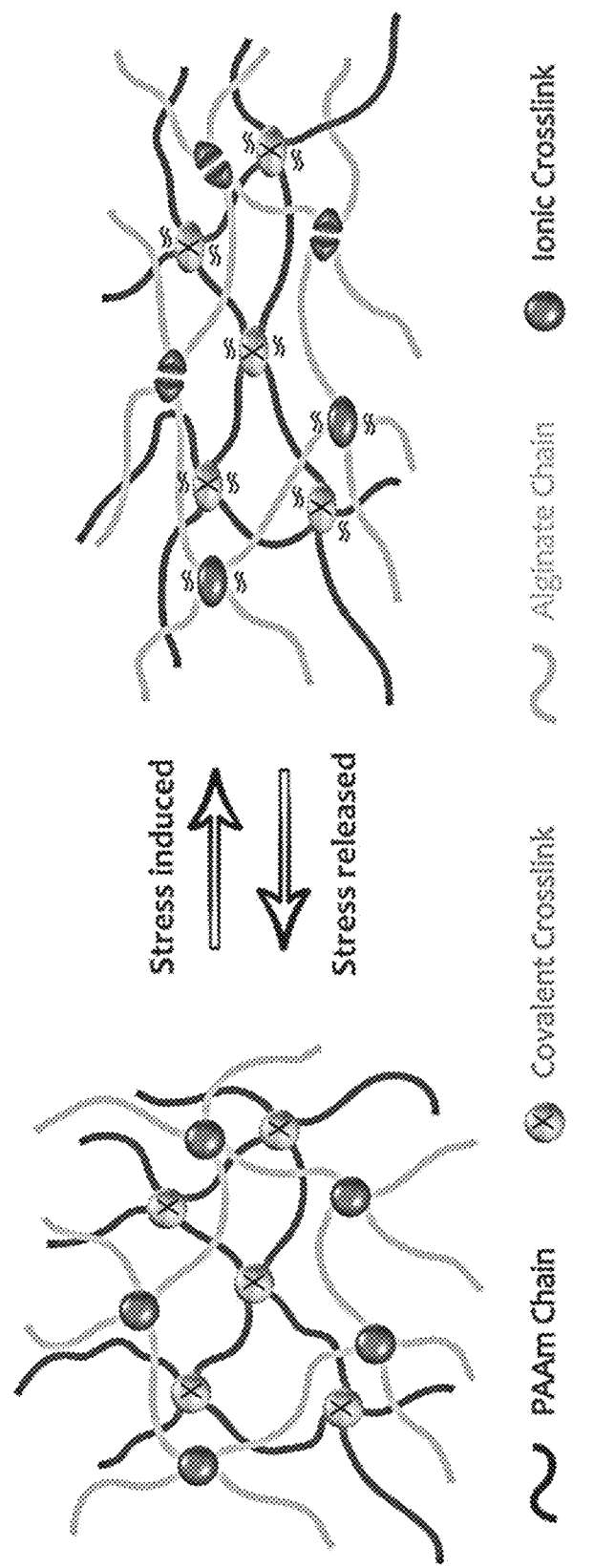
FIG. 7 is a schematic diagram showing the energy dissipation mechanism of the the Zn-alginate/PAAm hydrogel electrolyte.

The energy dissipation mechanism of the hydrogel electrolyte can be interpreted with reference to FIG. 7. When stress is induced on the electrolyte, the covalently crosslinked PAAm network is deformed while maintaining the shape and strength of the hydrogel from collapse, whereas the ionic crosslinks of the alginate network break, leading to effective energy dissipation. When the stress is released, the PAAm network recovers to a relaxed state and the ionic crosslinks in alginate network rebuild, resulting in hydrogel recovery. This reversible process also accounts for the largely enhanced fracture toughness of the electrolyte, which will be discussed set forth.

Figure 8A:
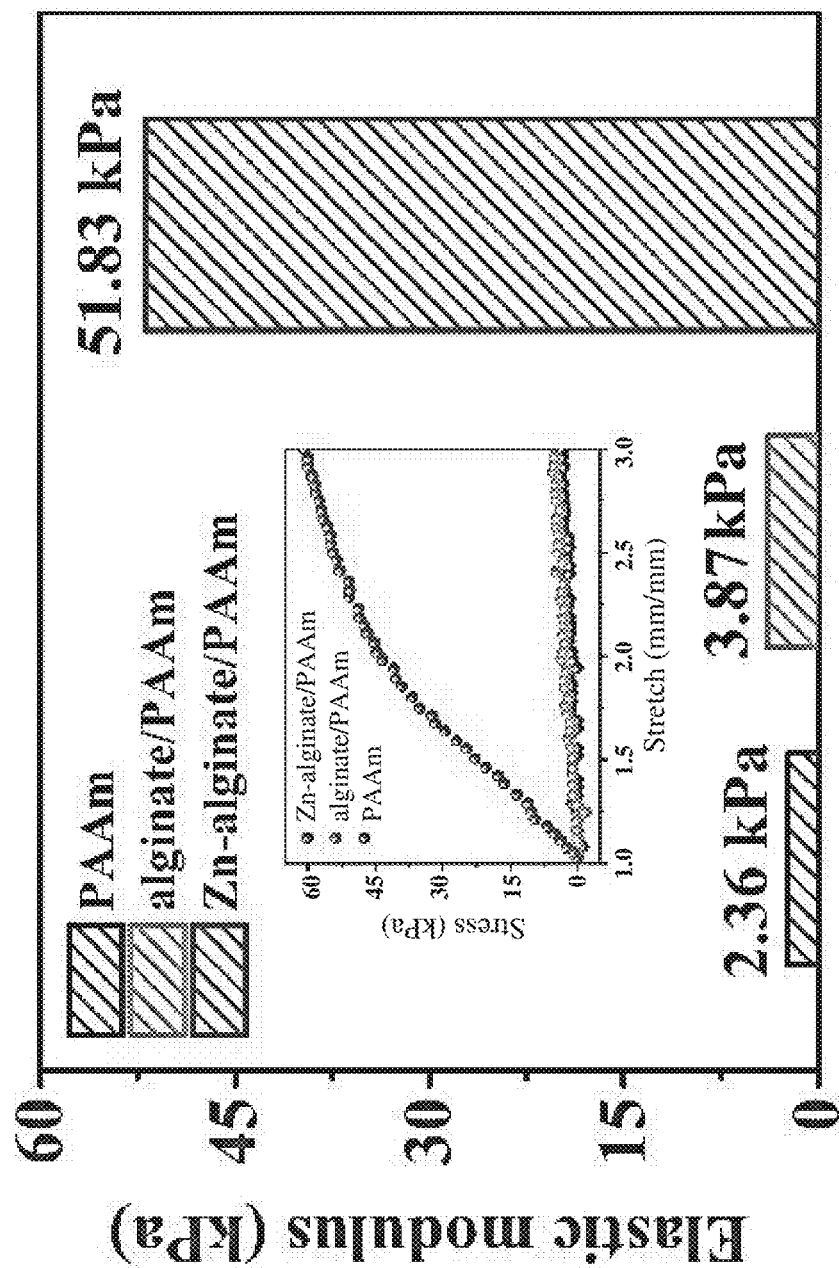
FIG. 8A is a plot showing the tensile modulus of different hydrogels. The insert is a plot of stress against stretch of the hydrogels.

The hydrogel structure was confirmed by FTIR and Raman spectra (data not shown), which revealed the formation of PAAm and the existence of alginate chains. With reference to FIG. 8A, there is provided with the tensile test results of the hydrogel electrolyte. As shown, the modulus of the hydrogel greatly increased from 2.36 kPa to 51.83 kPa after the introduction of the second ionic crosslinked alginate network, suggesting the contribution of the ionic crosslinked network to the substantially improved mechanical strength. Whilst the hydrogel becomes stronger, the hydrogel is still soft and elastic enough to be stretched, for example, over 500% by hand, making it suitable for flexible devices.

It is appreciated that any hydrogel electrolytes that are brittle or poor in mechanical strength, their electrochemical performance may be easily affected in response to damage or rupture during daily use. The enhanced mechanical strength may therefore alleviate these concerns. Moreover, the introduction of the reversible ionic bonds in the hydrogel may be a key to achieving the high fracture toughness/energy. The high fracture toughness may also represent the notch-insensitivity of the hydrogel, which is advantageous in maintaining the stability and durability of wearable applications.

Figure 8B:
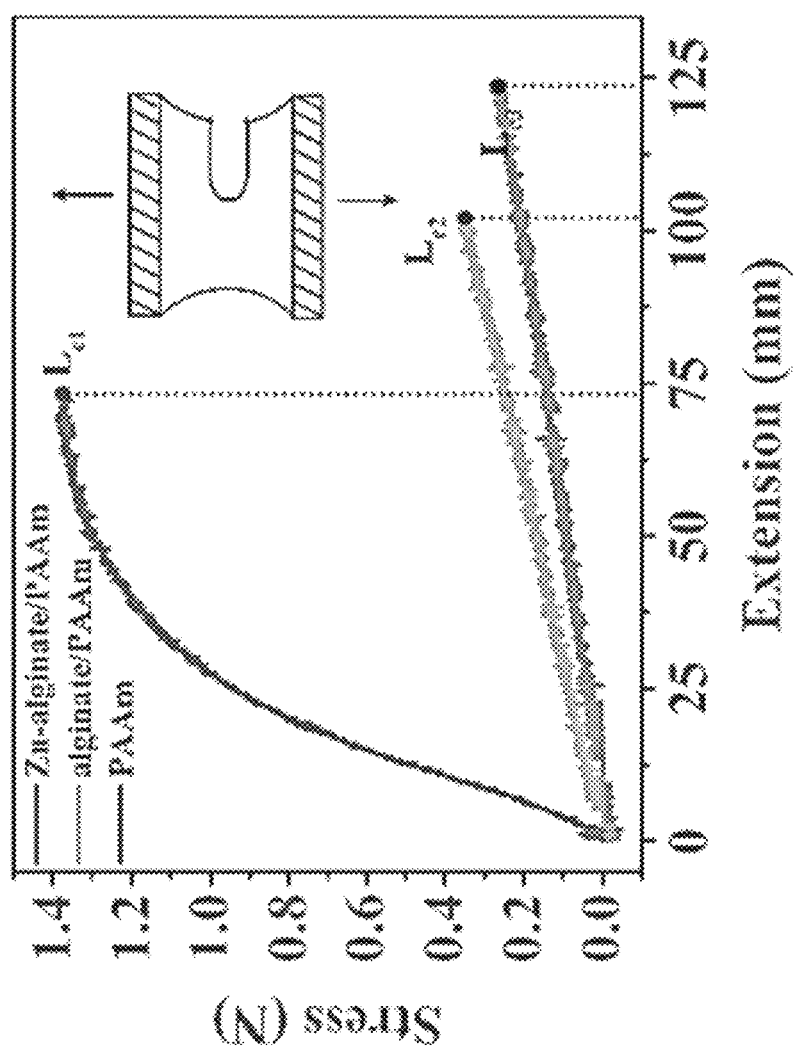
FIG. 8B is a plot of stress against extension showing the force-length curves of different hydrogels for determination of their fracture toughness. The insert is a schematic diagram illustrating the way that the hydrogels being cut and stretched.
Figure 8C:
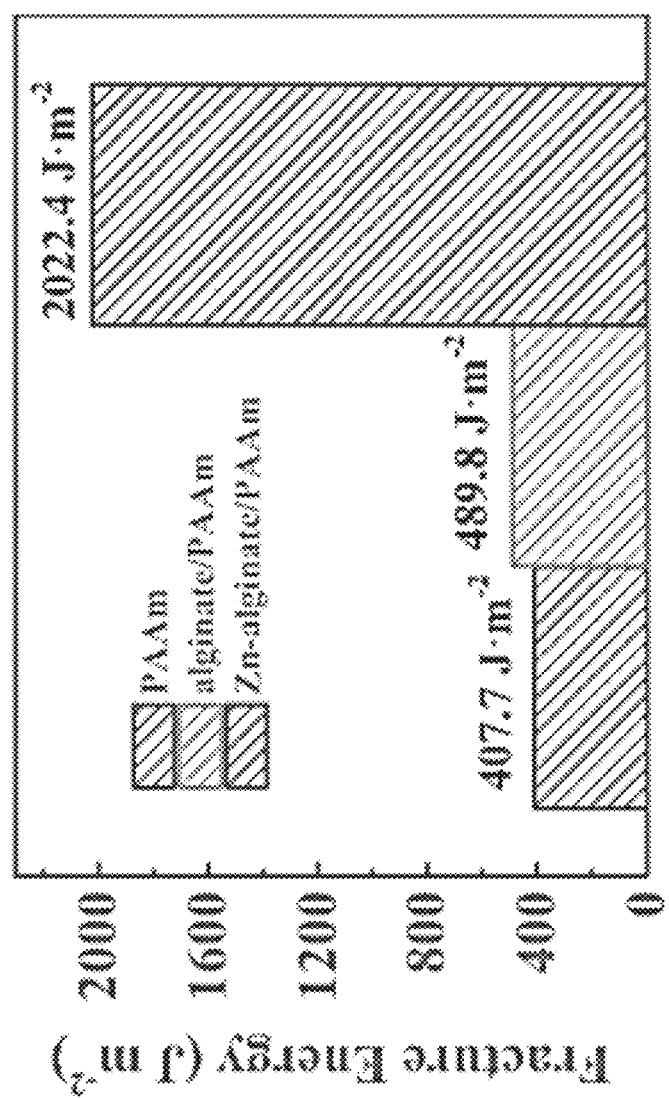
FIG. 8C is a plot showing the fracture toughness of different hydrogels.

To measure the fracture toughness of the hydrogels, a notch was cut on the hydrogels, and the hydrogels was stretched by a tensile machine till notch propagation was observed (the inset of FIG. 8B). The calculated values of fracture toughness are compared and area shown in FIG. 8C. Without the formation of reversible ionic crosslinks, pure PAAm and alginate/PAAm hydrogels showed a fracture toughness of 407.7 J m$^{-2}$ and 489.8 J m$^{-2}$, respectively. In sharp contrast, the Zn-alginate/PAAm hydrogel exhibited a fracture toughness of 2022.4 J m$^{-2}$, which is substantially higher as compared with the hydrogels without the ionic crosslinks (i.e. pure PAAm and alginate/PAAm).

Figure 8D:
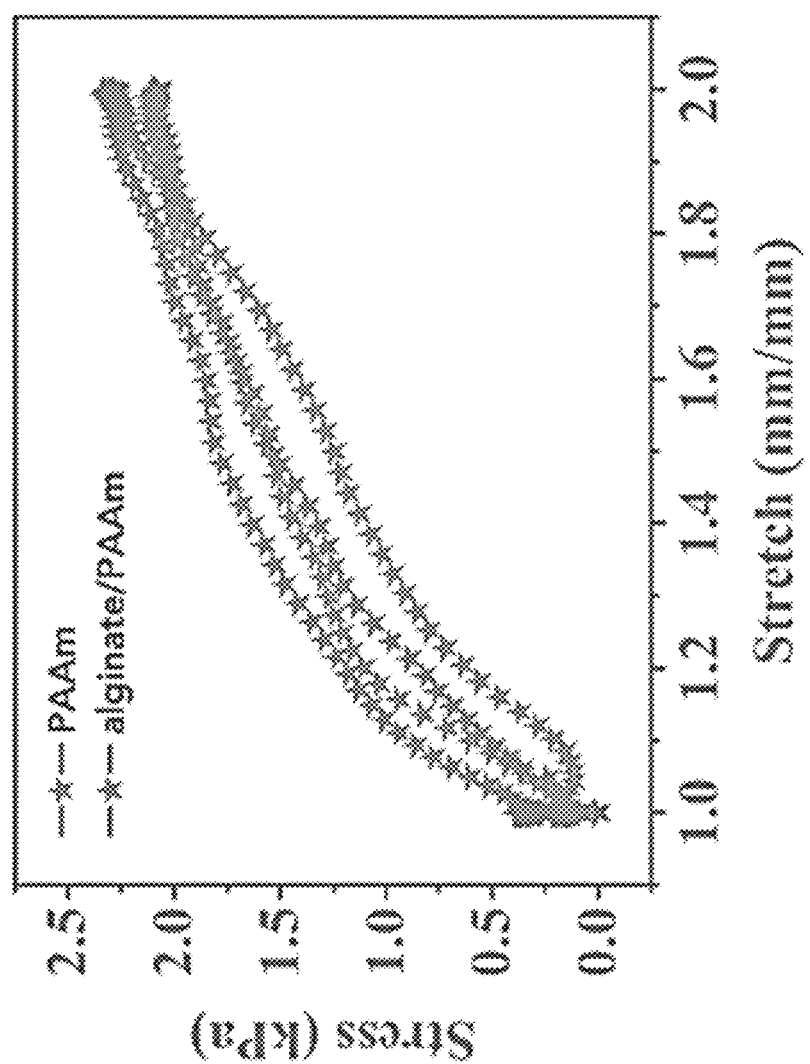
FIG. 8D is a plot of stress against stretch showing the hysteresis of pure PAAm and alginate/PAAm hydrogels at the stretch of 2.
Figure 8E:
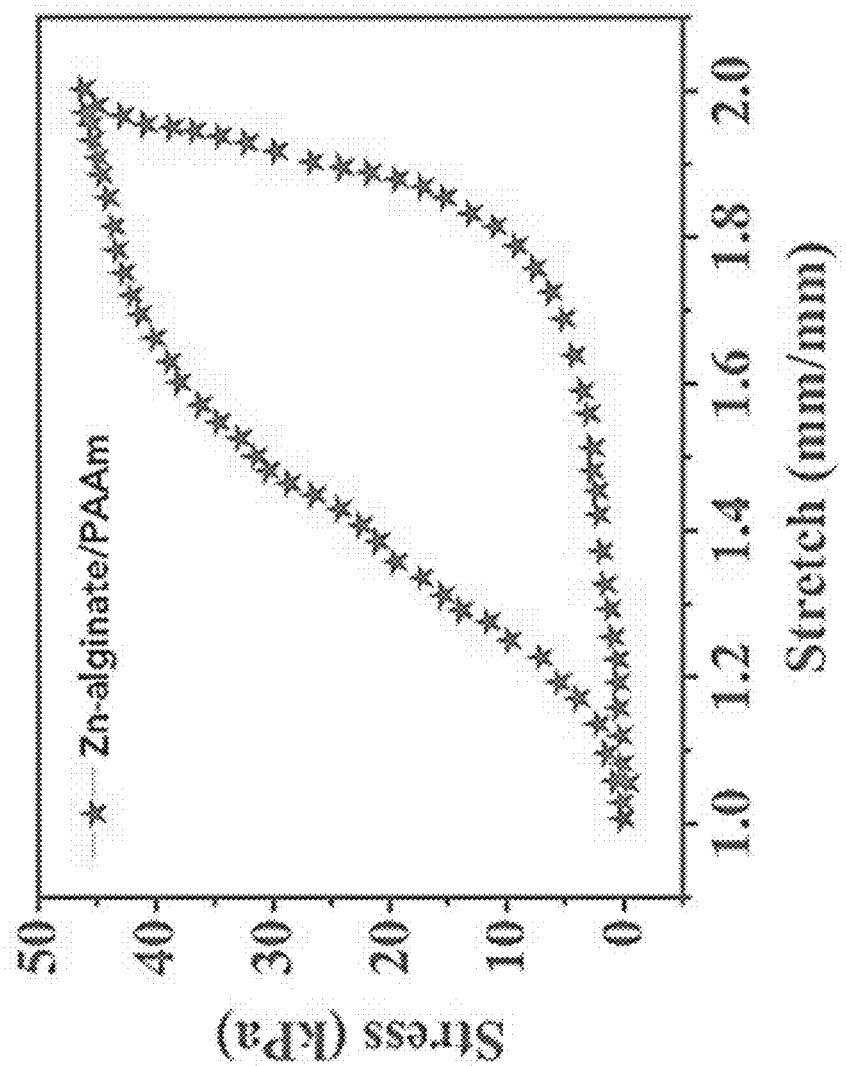
FIG. 8E is a plot of stress against stretch showing the hysteresis of Zn-alginate/PAAm hydrogel at the stretch of 2.

Such enhancement may be interpreted by adopting the Lake-Thomas model. For PAAm and alginate/PAAm hydrogels, when the notch is stretched, the network around the notch endures more stress than other parts of the hydrogels, and the covalent polymer chains in a small localized area break when the notch turns into a running crack, resulting in the small fracture toughness. For the Zn-alginate/PAAm hydrogel, the covalent network bridges the ionic network, and the ionic network sustains the stress by unzipping over a large area, alleviating the concentrated stress imposed on the covalent network. In that way, the external energy applied onto the alginate chains can be transferred to a larger zone, leading to a substantially increased fracture toughness. In other words, owing to the reversible ionic alginate network, the Zn-alginate/PAAm hydrogel dissipates mechanical energy more effectively than the pure PAAm and alginate/PAAm hydrogels, as revealed by the hysteresis loops shown in FIGS. 8D and 8E.

The area enclosed by loading/unloading curves represents the energy dissipated in the stretching/releasing testing cycle. The energy dissipated by pure PAAm and alginate/PAAm hydrogels was neglectable (≤0.3 kJ m$^{-3}$), while Zn-alginate/PAAm hydrogel exhibited pronounced hysteresis, the energy dissipated was calculated to be as high as 19.17 kJ m$^{-3}$. More importantly, it is appreciated that hydrogels showing pronounced hysteresis may not necessary to get rid of a permanent deformation. However, the Zn-alginate/PAAm hydrogel of the present invention showed a neglectable permanent deformation, as a result of the reversible action of the ionic crosslinks in response to stress loading and unloading. With the synergism of covalently crosslinked PAAm network and ionic crosslinked alginate network, a hydrogel electrolyte that possesses both softness and high toughness is therefore obtained.

Figure 9A:
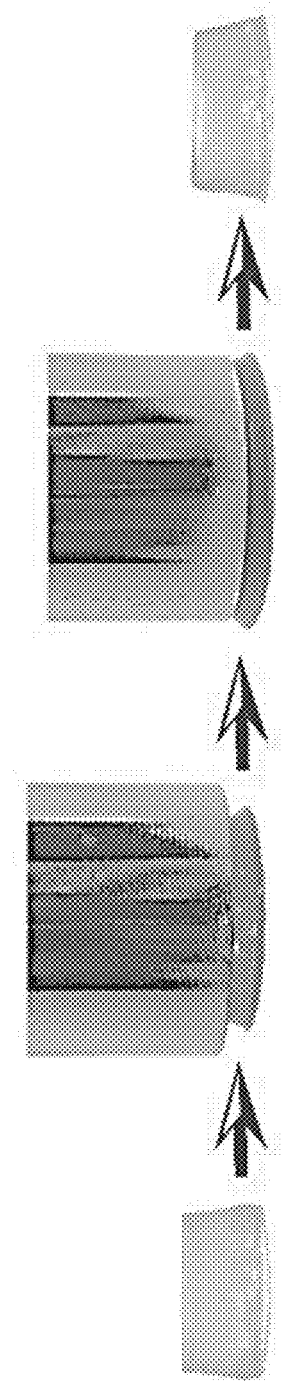
FIG. 9A is an optical image showing the process flow of compressing the Zn-alginate/PAAm hydrogel.
Figure 9B:
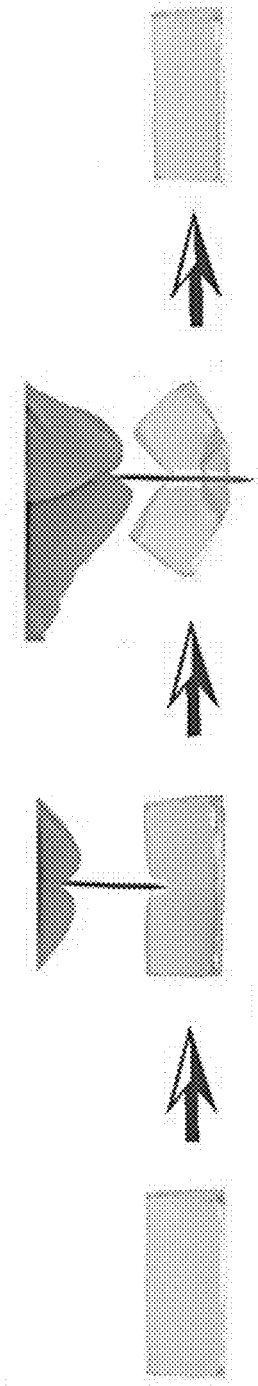
FIG. 9B is an optical image showing the process flow of cutting the Zn-alginate/PAAm hydrogel from top to bottom.

The mechanical advantages of the Zn-alginate/PAAm hydrogel are further demonstrated as shown in FIGS. 9A to 9G. As shown in FIG. 9A, the Zn-alginate/PAAm hydrogel (ca. 1 cm thick) was severely compressed to about one-third of its initial thickness. After unloading, the hydrogel fully recovered without any damage. The hydrogel was subsequently heavily cut from top to bottom with a blade as shown in FIG. 9B. The hydrogel remained intact without visible scar left after cutting. These phenomena verified the effective energy dissipation of the hydrogel: upon compressing/cutting, the stress applied was largely dispersed by the unzipping of ionic crosslinks so that the covalently crosslinked PAAm chains can avoid stress concentration thereon, thereby effectively dissipating the energy and stabilizing the hydrogel.

Same operations were performed on pure PAAm and alginate/PAAm hydrogels which caused obvious damages. Gelatin electrolyte with the same water content was also adopted for comparison. Under the same operation conditions, the gelatin electrolyte showed extremely brittle characteristics and was easily crushed and cut apart during compressing and cutting. All these features were accounted for by the absence of energy dissipation in these hydrogels. As a result, the stress is concentrated and directly applied on the covalent chains, leading to inevitable chain rupture and consequently gel damage.

Figure 9C:
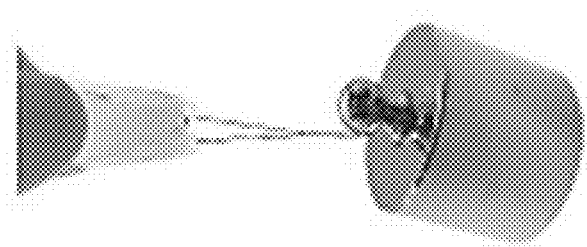
FIG. 9C is an optical image showing the Zn-alginate/PAAm hydrogel being hung with a 500-g weight using a thin string.

The Zn-alginate/PAAm hydrogel was also tough enough to hang a 500-g weight with a thin string, while there is no damage induced on the hydrogel (FIG. 9C). In contrast, the pure PAAm was easily ruptured during hanging. The Zn-alginate/PAAm hydrogel was further subjected to several "poking-and-stretching" tests as shown in FIGS. 9D to 9F. The hydrogel was either stretched and poked with a shape needle (FIG. 9D); stretched after being introduced a numerous tiny through-holes thereon (FIG. 9E); or stretched after being introduced a numerous tiny through-holes and a big through-hole thereon (FIG. 9F).

Due to the effective energy dissipation, the hydrogel sustained the extremely high concentrated stress when being poked, and kept intact during the reversible stretching, showing high notch-insensitivity that is in accordance with its high fracture toughness. After repeated stretching, the hydrogel with numerous tiny through-holes and a big through-hole was still soft yet tough enough to be wrapped on a toy statue without rupture (FIG. 9G).

Figure 10A:
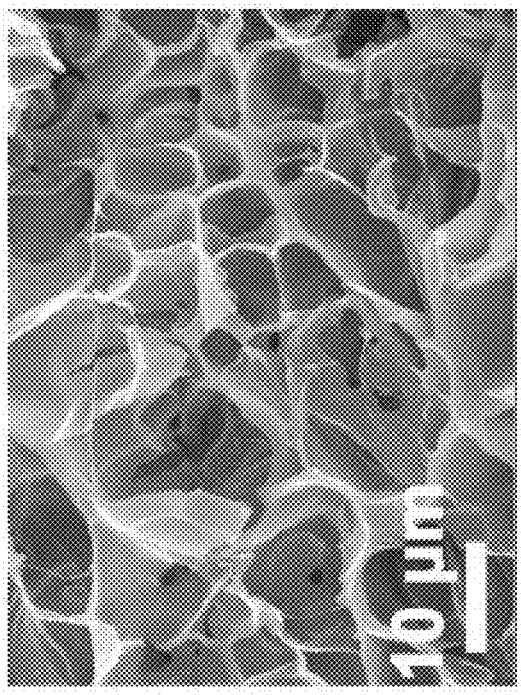
FIG. 10A is a scanning electron microscopy (SEM) image revealing the interconnected porous structure of the Zn-alginate/PAAm hydrogel.
Figure 10B:
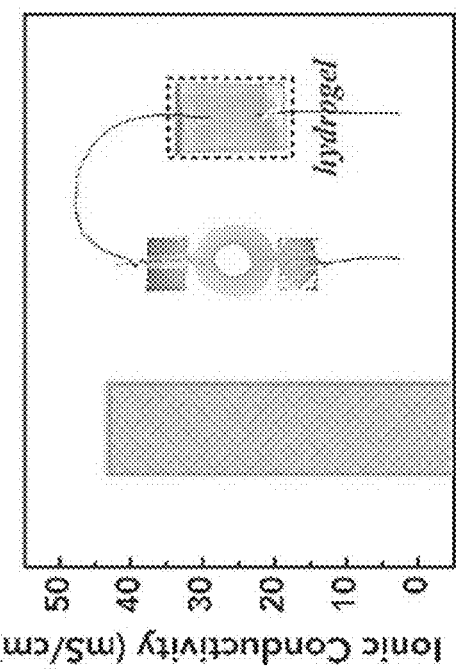
FIG. 10B is a plot showing the ion conductivity of the Zn-alginate/PAAm hydrogel. The insert is an optical image showing Zn-alginate/PAAm hydrogel serving as an ionic conductor in a LED circuit.

SEM image showed that the Zn-alginate/PAAm hydrogel possessed a porous structure, which is beneficial for ion transport if it is used as an electrolyte (FIG. 10A). The ionic conductivity of the Zn-alginate/PAAm hydrogel electrolyte reached 43.2 mS cm$^{-2}$ (FIG. 10B), which is in the same level as pure PAAm, suggesting that the dual-crosslinking does not affect the capability of transporting ions within the porous networks. The high ionic conductivity was demonstrated by connecting the hydrogel into a circuit that lights up a LED (the insert of FIG. 10B).

With the aforementioned desired mechanical properties, including high flexibility and toughness and good ionic conductivity, the hydrogel of the present invention may be an ideal electrolyte for batteries to adapt to flexible and wearable applications. In this regard, the Zn-alginate/PAAm hydrogel was applied as an electrolyte for zinc-ion batteries.

Carbon nanotube (CNT) papers were used as substrates for electrodes, as they can provide high flexibility as well as sufficient mechanical strength. SEM analysis revealed the rough and intertwined structure of CNT paper, which is beneficial for active material loading. $\alpha$-MnO$_2$ was hydrothermally synthesized as the cathode material, whereas zinc was electrochemically deposited onto the CNT papers as anode. XRD analysis confirmed the high crystallinity of $\alpha$-MnO$_2$ and the successful deposition of zinc metal. SEM analysis revealed the homogeneous one-dimensional nanofibers of $\alpha$-MnO$_2$, whose length was ranged from one to a few micrometres, with a diameter of around 20-30 nanometres. The SEM analysis also indicated that the electrodeposited zinc nanosheets possess a uniform porous structure, which favors the penetration of electrolyte and the fast ion transport. Furthermore, zinc nanosheets were firmly grown onto CNT paper substrates in-situ, avoiding any exfoliation of the zinc layer from the CNT papers during repeated mechanical operations.

Figure 11:
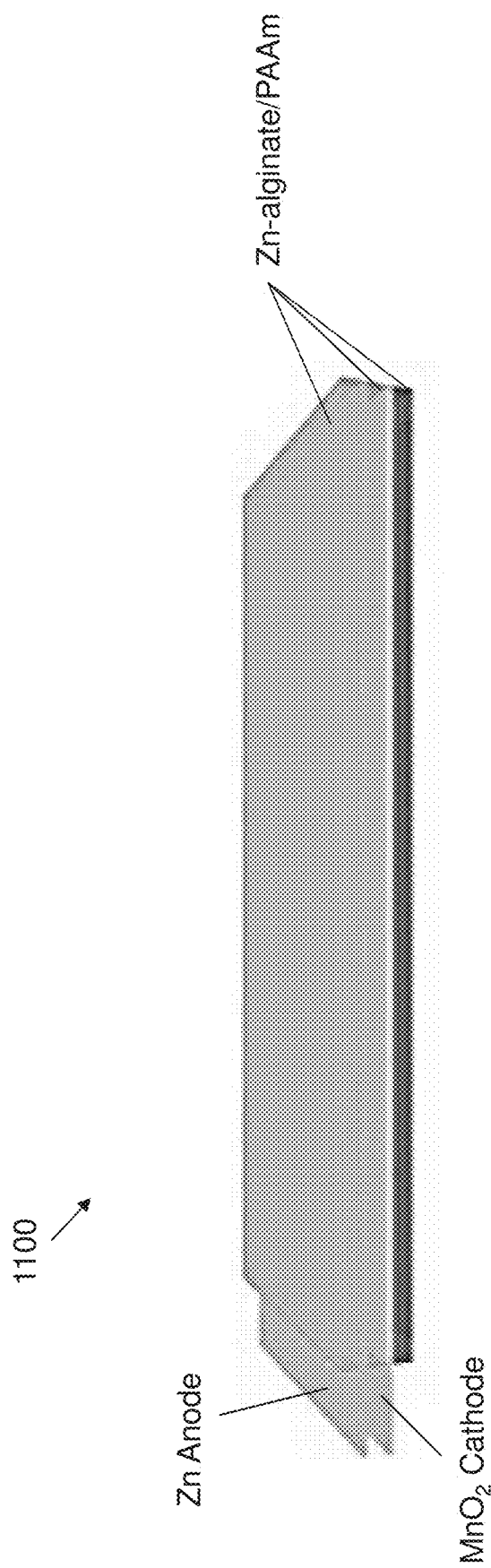
FIG. 11 is schematic representation of a Zn—$MnO_2$ battery in accordance with one embodiment of the present invention.

As mentioned above, the Zn-alginate/PAAm hydrogel is capable of effectively disperse the mechanical stresses imposed thereon. Thus, it may be further applied as a protective layer for the electrodes, preventing the electrodes from detaching upon receiving repeated mechanical stress. Accordingly, a Zn—MnO$_2$ battery 1100 was assembled by attaching a thin layer of Zn-alginate/PAAm hydrogels in between and on the outer sides of the zinc anode and the MnO$_2$ cathode, forming a five-layered structure as shown in FIG. 11.

Figure 12A:
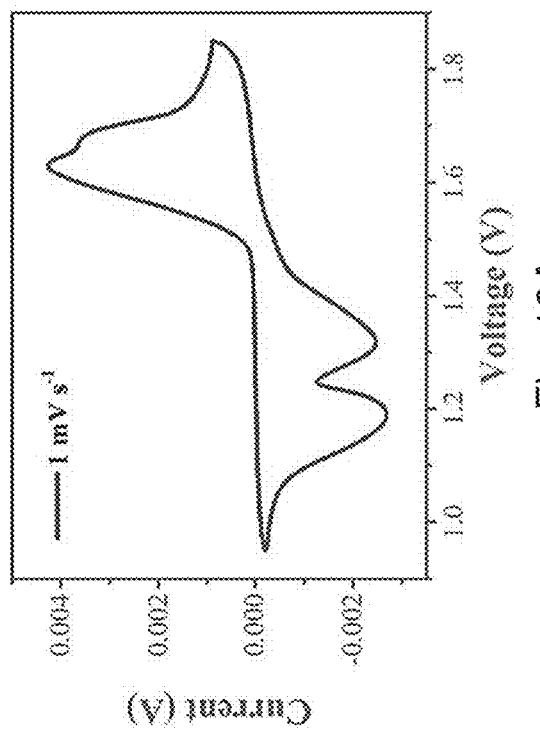
FIG. 12A is a plot of current against voltage showing the CV curve of the Zn—$MnO_2$ battery of FIG. 11 at a scan rate of 1 mV s$^{-1}$.

With reference to FIG. 12A, there is provided with the cyclic voltammetry (CV) curve of the as-assembled Zn—MnO$_2$ battery 1100 at a scan rate of 1 mV s$^{-1}$. Its two reduction peaks at 1.2-1.3 V are ascribed to the formation of MnOOH and the consequent stripping of zinc metal, whereas the oxidization peak at 1.6-1.7 V is ascribed to the transformation from MnOOH to MnO$_2$ together with the plating of zinc. The overall reaction of the battery mechanism can be formulated as below:

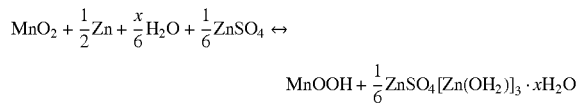

$$MnO_2 + \frac{1}{2}Zn + \frac{x}{6}H_2O + \frac{1}{6}ZnSO_4 \leftrightarrow$$
$$MnOOH + \frac{1}{6}ZnSO_4[Zn(OH_2)]_3 \cdot xH_2O$$

Figure 12B:
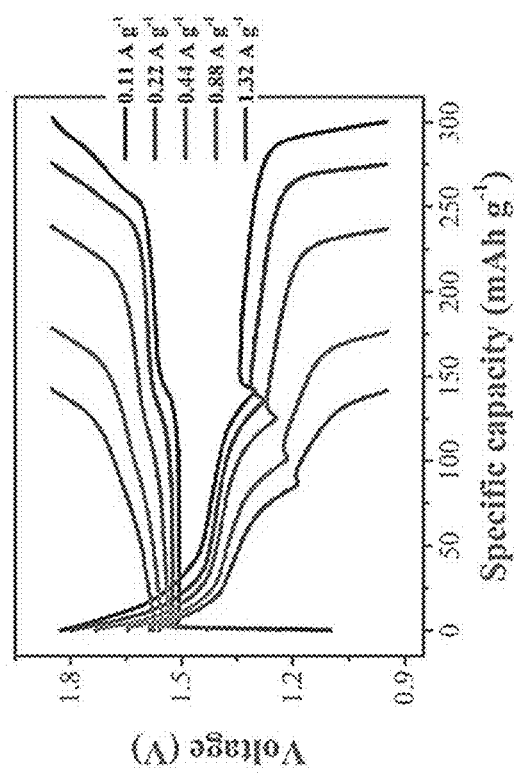
FIG. 12B is a plot of voltage against specific capacity showing the GCD curves of the Zn—$MnO_2$ battery of FIG. 11 at various current densities.

The galvanostatic charge/discharge (GCD) curves of the battery at various current densities are shown in FIG. 12B. As shown, the two plateaux characteristics of the GCD curves are consistent with the two pairs of redox peaks in the CV curve.

Figure 12C:
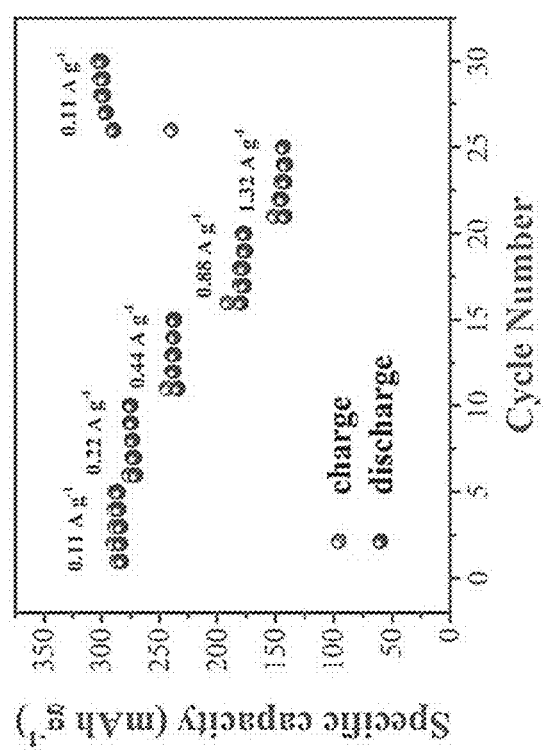
FIG. 12C is a plot of specific capacity against cycle number showing the rate performance of the Zn—$MnO_2$ battery of FIG. 11 cycled at various current densities.

With reference to FIGS. 12B and 12C, the battery exhibited good rate performance and delivered specific capacities of 300.4 mAh g$^{-1}$, 275 mAh g$^{-1}$, 237.8 mAh g$^{-1}$, 179.7 mAh g$^{-1}$, and 144.5 mAh g$^{-1}$ at the current densities of 0.11 A g$^{-1}$ 0.22 A g$^{-1}$, 0.44 A g$^{-1}$, 0.88 A g$^{-1}$, and 1.32 A g$^{-1}$, comparable to those employing liquid electrolyte, suggesting the good electrochemical performance of the hydrogel electrolyte. The specific capacities and rate performance are similar to those of the Zn—MnO$_2$ battery based on pure PAAm hydrogel electrolyte, suggesting that the introduction of ionic crosslinked alginate network does not affect the hydrogel functioning as an electrolyte. For comparison, the Zn—MnO$_2$ battery 1100 based on gelatin electrolyte showed inferior performances, which may be mainly ascribed to the lower ionic conductivity of gelatin and much larger charge transfer resistant.

Figure 12D:
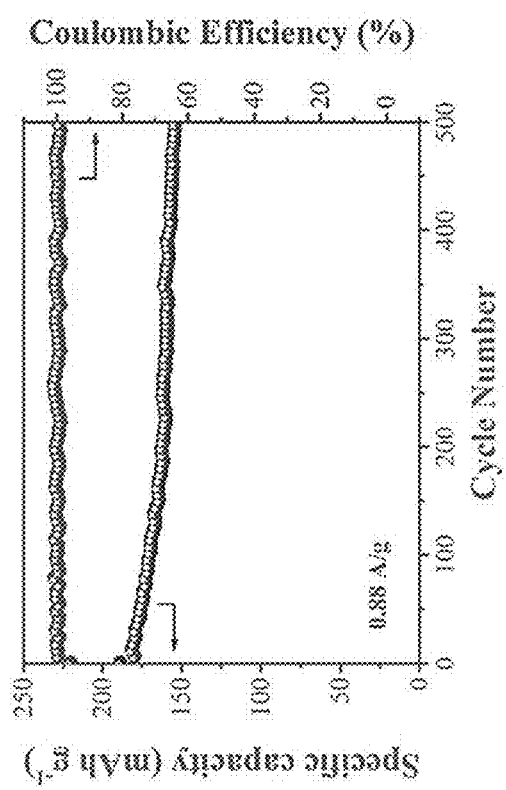
FIG. 12D is a plot showing the long-term cycle test results of the Zn—$MnO_2$ battery of FIG. 11 at 0.88 A g$^{-1}$.
Figure 12E:
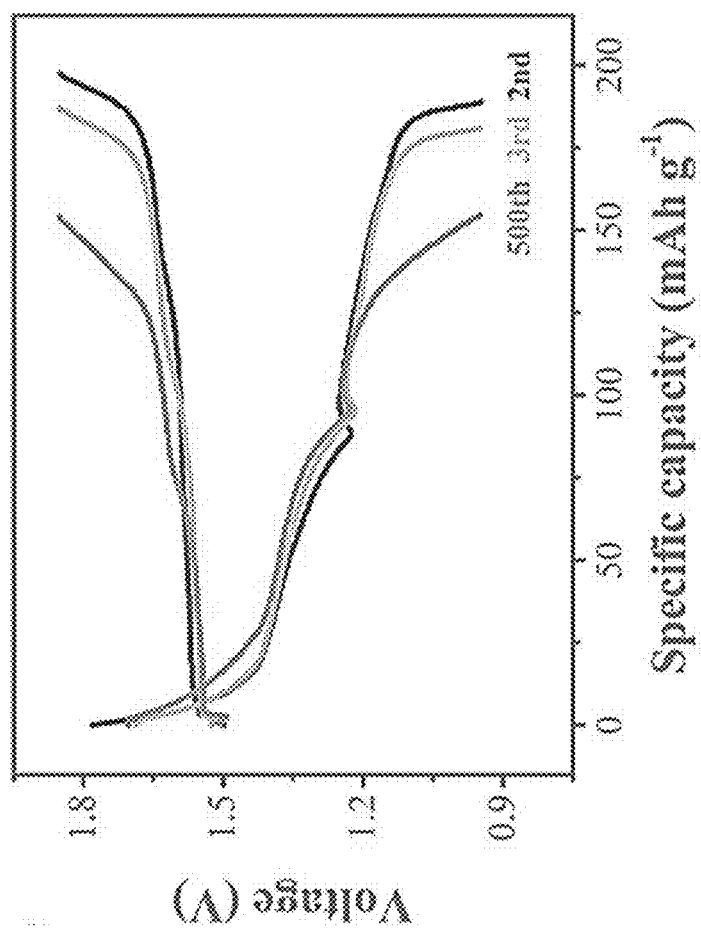
FIG. 12E is a plot of voltage against specific capacity showing the selected GCD curves obtained from the cycle test of FIG. 12D.
Figure 13A:
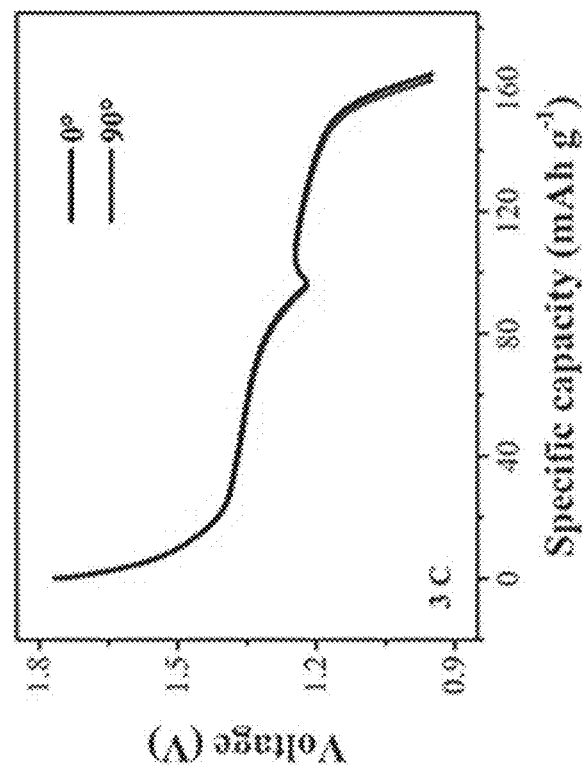
FIG. 13A is a plot of voltage against specific capacity showing the discharge curve of the Zn—$MnO_2$ battery of FIG. 11 being repeatedly bent at 45°.
Figure 13B:
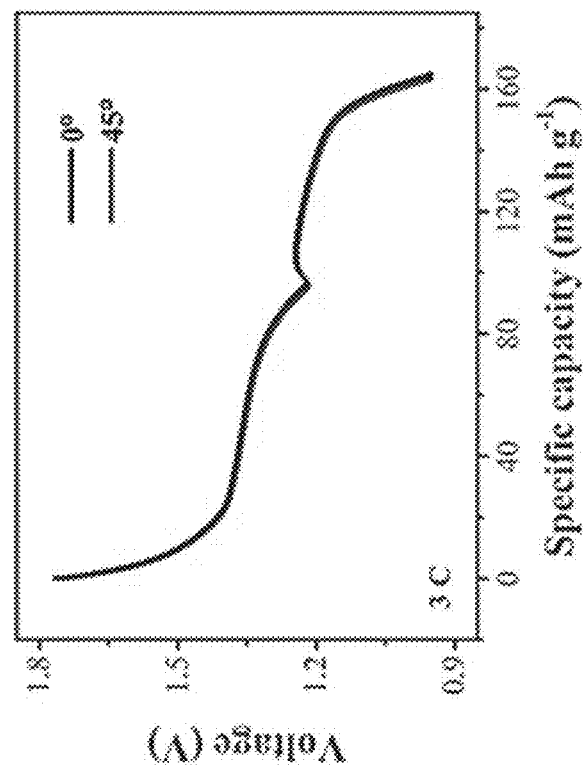
FIG. 13B is a plot of voltage against specific capacity showing the discharge curve of the Zn—$MnO_2$ battery of FIG. 11 being repeatedly bent at 90°.
Figure 13C:
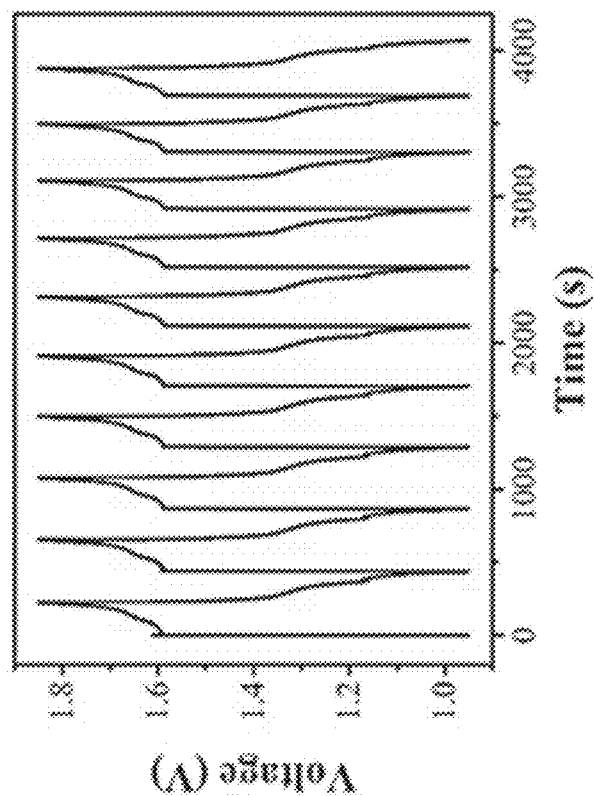
FIG. 13C is a plot of voltage against specific capacity showing the discharge curve of the Zn—$MnO_2$ battery of FIG. 11 being repeatedly bent at 180°.
Figure 13D:
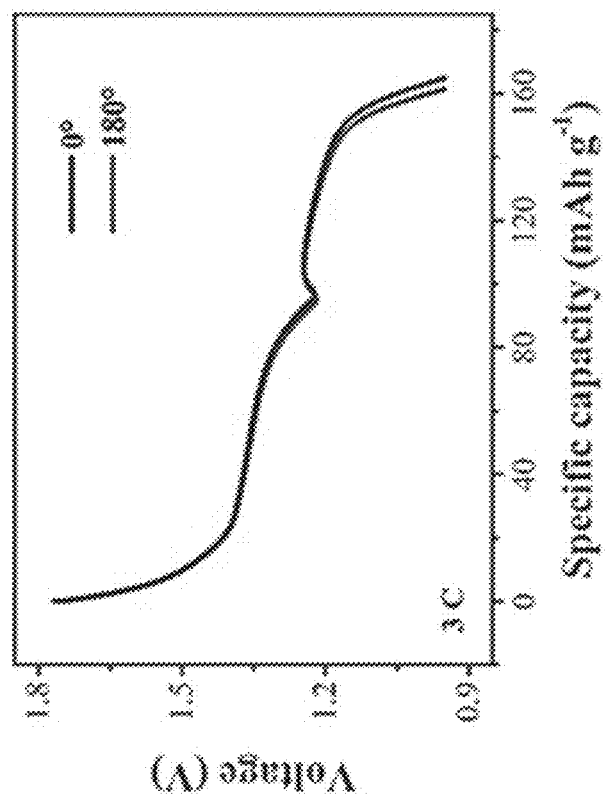
FIG. 13D is a plot of voltage against time showing successive GCD curves of the Zn—$MnO_2$ battery of FIG. 11 being intermittently dynamically bent at 90°.

EIS spectra revealed that the charge transfer resistance of the Zn—MnO$_2$ battery 1100 based on Zn-alginate/PAAm hydrogel electrolyte was almost unchanged after various stimuli (FIG. 12D). The long-term stability of the Zn—MnO$_2$ battery was also examined and the result was shown in FIG. 12E. As shown, 82% of initial capacity was preserved after cycling the battery at 0.88 A g$^{-1}$ for 500 charge-discharge cycles, indicating a good cycling stability of the battery 1100.

Due to the thin CNT paper electrodes and soft hydrogel electrolyte, the resultant Zn—MnO$_2$ battery 1100 is highly flexible. In order to demonstrate its high flexibility and stability against dynamical deformations, the battery was repeatedly bent at various angles while the corresponding discharge curves were simultaneously recorded.

It is appreciated that the test results of static bending test (i.e. fixing the devices at certain bending angles) may not necessarily reflect the stability of a device during practical applications, since any minor disturbances would lead to deviation in the electrochemical curves as well as fluctuation in energy output. In this regard, the tests presented herein are more dynamical and complex.

As shown in FIGS. 13A to 13D, the discharge curve of the battery recorded at a bending state was almost overlapping with the discharge curve without bending, suggesting the stable energy output of the battery during dynamical deformations. It may be attributed to the good adhesion between electrodes and electrolyte as well as the effective energy dissipation that transfers the induced mechanical stress into a larger zone, minimizing the stress influences on the electrodes.

The stability and durability of the battery were further demonstrated by investigating the influences of various mechanical stimuli on the electrochemical performance of the battery. The mechanical stimuli include cutting (FIGS. 14A and 14B), folding and pressing (FIGS. 14C), squeezing (FIG. 14D), twisting (FIG. 14E), and hammering (FIG. 14F). All the discharge curves were measured at the current density of 0.924 A g$^{-1}$ (3C rate).

Figure 14B:
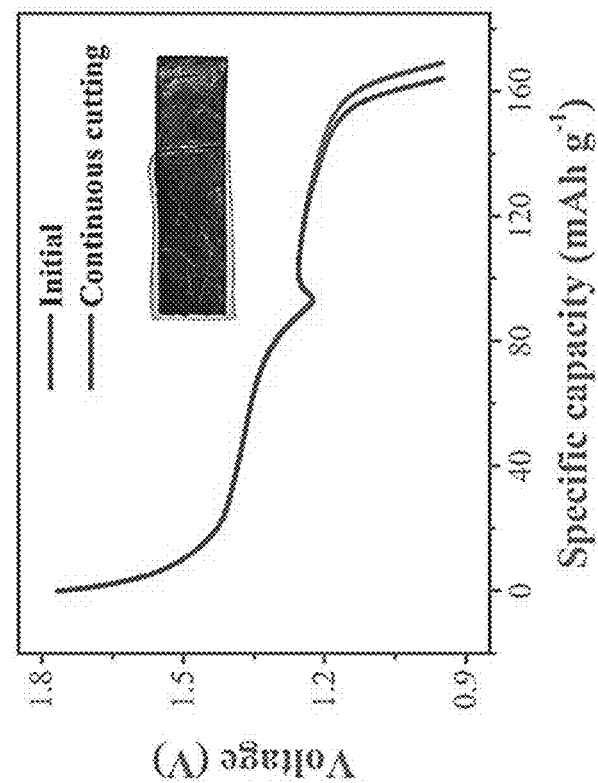
FIG. 14B is a plot of voltage against specific capacity showing the discharge curve of the Zn—$MnO_2$ battery of FIG. 11 being continuously cut. The insert is an optical image showing the intact electrode surface after cutting.
Figure 14A:
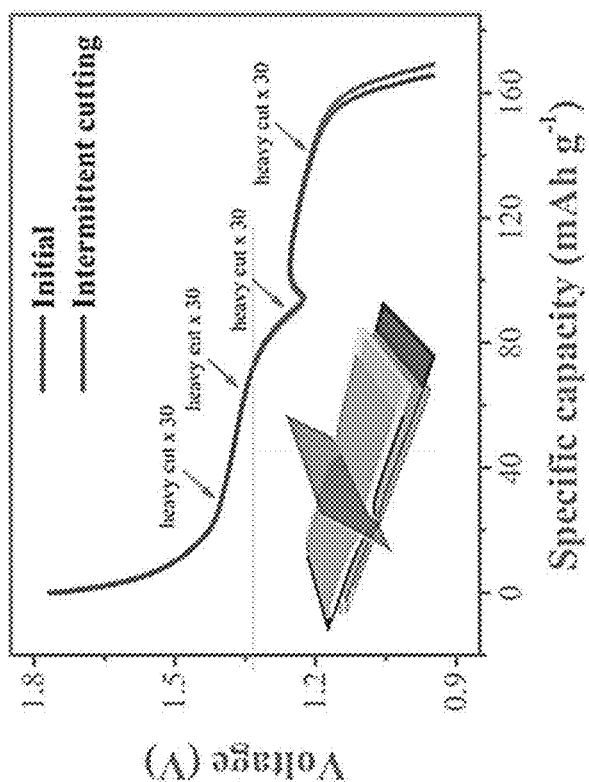
FIG. 14A is a plot of voltage against specific capacity showing the discharge curve of the Zn—$MnO_2$ battery of FIG. 11 being intermittently cut (30 times of cutting as a set, the cutting force was around 10-20 N). The inset is a schematic representation showing the way that the battery being cut.

As shown in FIGS. 14A and 14B, heavy cut was performed on the battery body by using a sharp blade. The cutting was firstly intermittently applied (FIG. 14A, 30 times of cutting as a set, the cutting force was around 10-20 N), and then continuously performed (FIG. 14B). Despite a minor decrease in capacity, the recorded discharge curves with cutting were smooth and no fluctuations can be observed, and the electrode surface was intact without damage, indicating the high durability and stability of the battery.

Figure 14D:
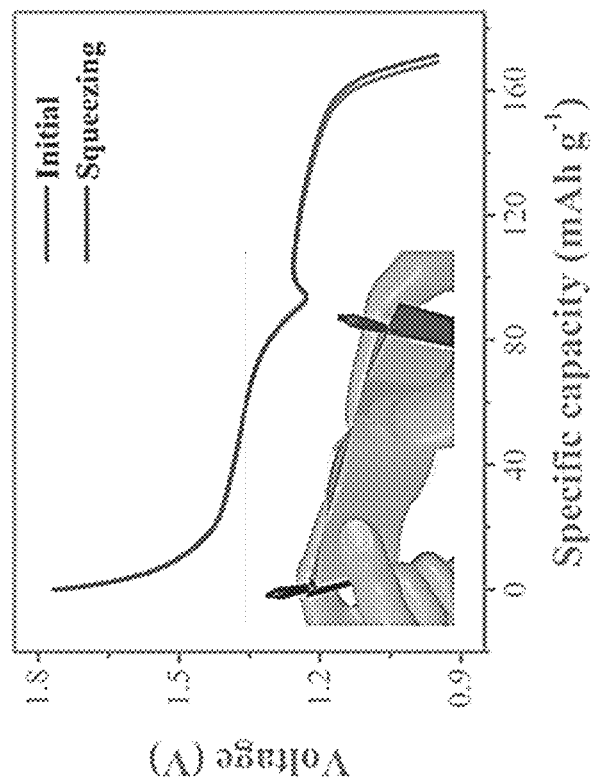
FIG. 14D is a plot of voltage against specific capacity showing the discharge curve of the Zn—$MnO_2$ battery of FIG. 11 being dynamically squeezed.
Figure 14C:
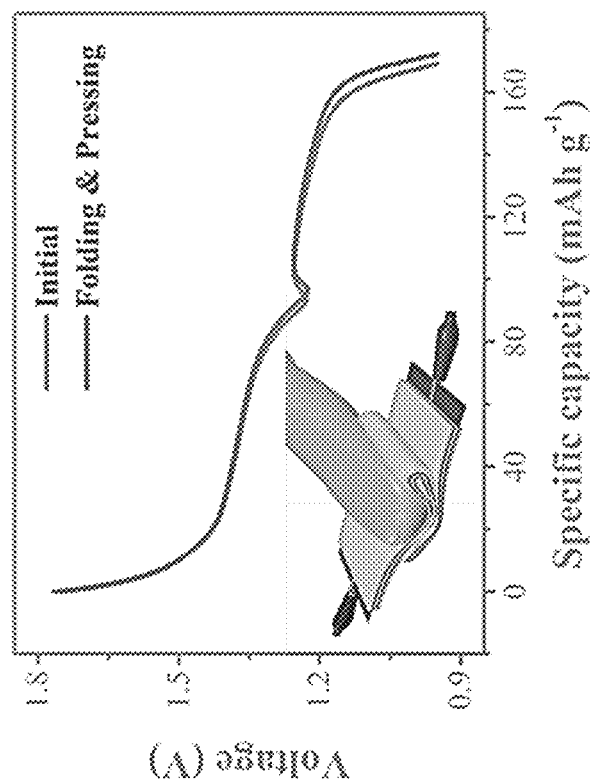
FIG. 14C is a plot of voltage against specific capacity showing the discharge curve of the Zn—$MnO_2$ battery of FIG. 11 being dynamically folded and pressed.
Figure 14F:
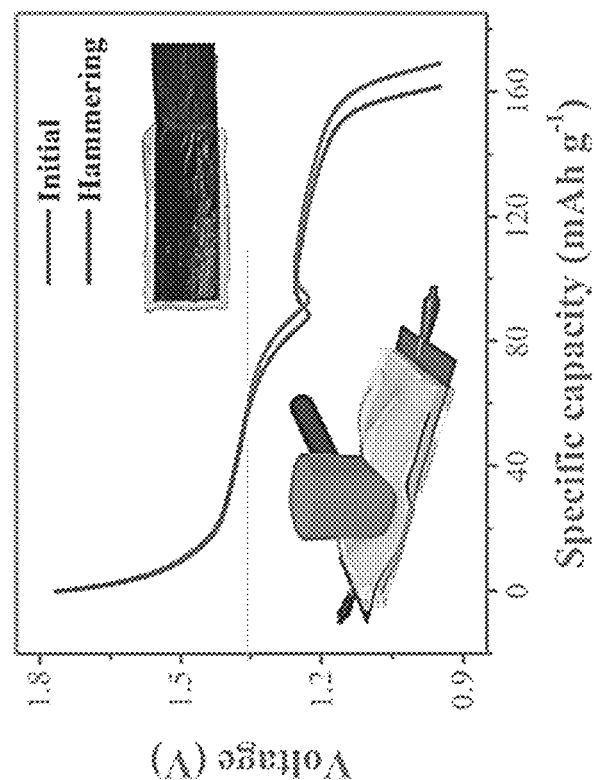
FIG. 14F is a plot of voltage against specific capacity showing the discharge curve of the Zn—$MnO_2$ battery of FIG. 11 being dynamically hammered. The insert is an optical image showing the intact electrode surface after hammering.
Figure 14E:
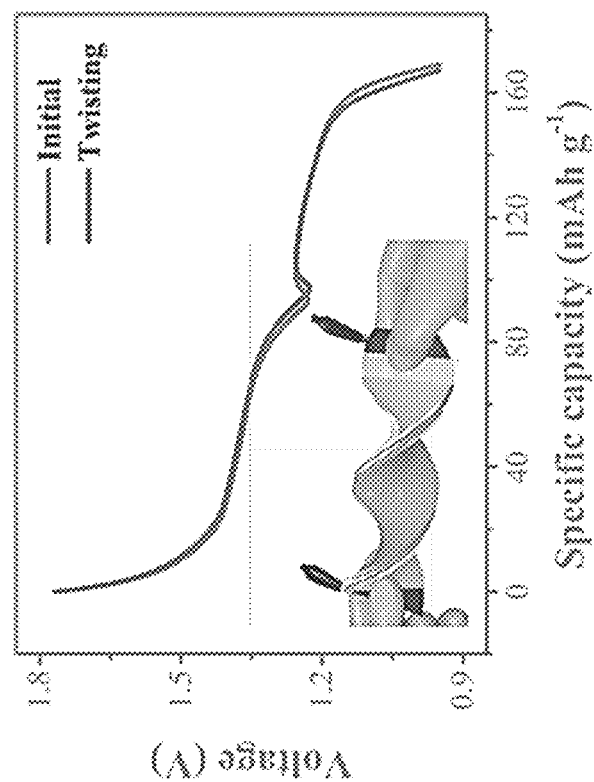
FIG. 14E is a plot of voltage against specific capacity showing the discharge curve of the Zn—$MnO_2$ battery of FIG. 11 being dynamically twisted.

Other severe dynamical stimuli including folding and pressing, squeezing, and twisting were subsequently applied, the battery still kept its stable electrochemical performances (FIGS. 14C to 14E). The discharge curves under these dynamical stimuli were almost the same as the curve recorded under initial relaxed state. The insignificant deviation may be due to the micro detachments or slightly increased contact area between the electrodes and electrolyte under various mechanical stresses. The electrode materials, on the one hand, may be further exposed to electrolyte when the electrodes were microcosmically stretched, and on the other hand the materials become less exposed when the electrodes were microcosmically shrunk. As a result, the capacity may be slightly increased or decreased.

As shown in FIG. 14F, the battery 1100 was heavily hammered so as to simulate high mechanical impact that may encounter in real life during applications. As shown, the battery was strong enough to sustain such high impact, with its electrochemical performances well maintained, as the impact can be effectively buffered and dissipated. Same tests were performed on Zn—MnO$_2$ batteries based on pure PAAm and gelatin for comparison. These batteries were severely affected and even failed during dynamical twisting, cutting and hammering. It is because without energy dissipation, the external stresses were highly concentrated and localized, leading to the rupture of hydrogel electrolytes and consequent damages to electrodes.

Figure 15A:
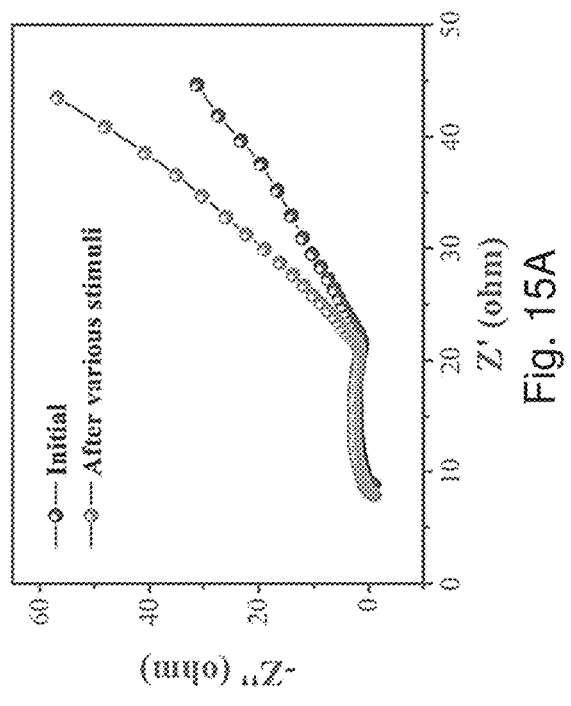
FIG. 15A is a plot showing the EIS of the Zn—$MnO_2$ battery of FIG. 11 before and after various mechanical stimuli.
Figure 15B:
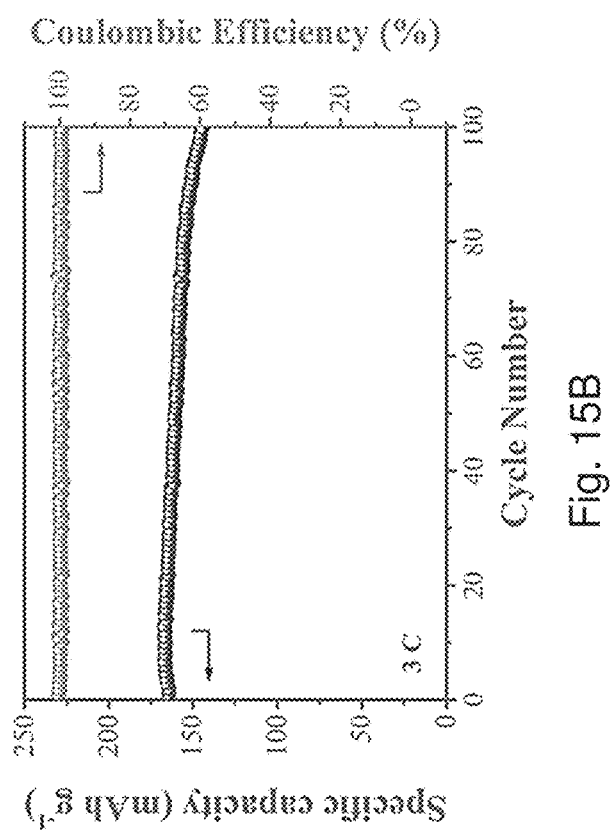
FIG. 15B is a plot showing the cycle test results of the Zn—$MnO_2$ battery of FIG. 11 after experiencing various mechanical stimuli at 0.924 A g$^{-1}$ (3C rate).

The stability of the Zn—MnO$_2$ battery based on Zn-alginate/PAAm hydrogel electrolyte after various mechanical stimuli has been further examined. As revealed by the EIS spectra and cycling test as shown in FIGS. 15A and 15B, respectively, the charge transfer resistance of the battery 1100 was almost unchanged whereas its long-term cycle stability was not affected by the aforementioned severe mechanical stimuli, suggesting its good durability in practical applications.

It is appreciated that even a flexible energy storage device may be capable of being bent or twisted to some extent; it may not be soft enough to accommodate all sorts of deformations, and therefore hindering its applications. The Zn—MnO$_2$ battery 1100 of the present disclosure is advantageous in view of the situation set forth above, as the combination of softness and toughness of the battery renders it arbitrary deformable and stable electrochemical performances.

Figure 16B:
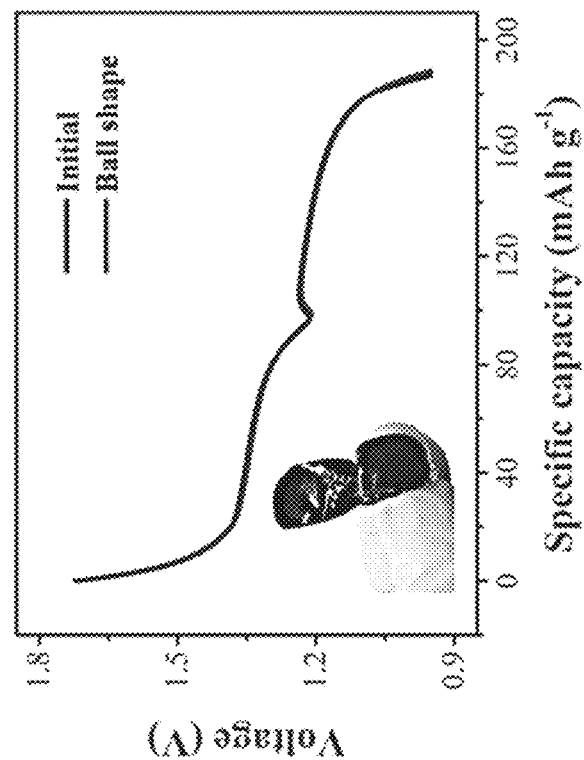
FIG. 16B is a plot of voltage against specific capacity showing the discharge curve of the Zn—$MnO_2$ battery of FIG. 11 in the state of a kneaded ball shape. The insert is an optical image showing the battery in the state of a kneaded ball shape.
Figure 16A:
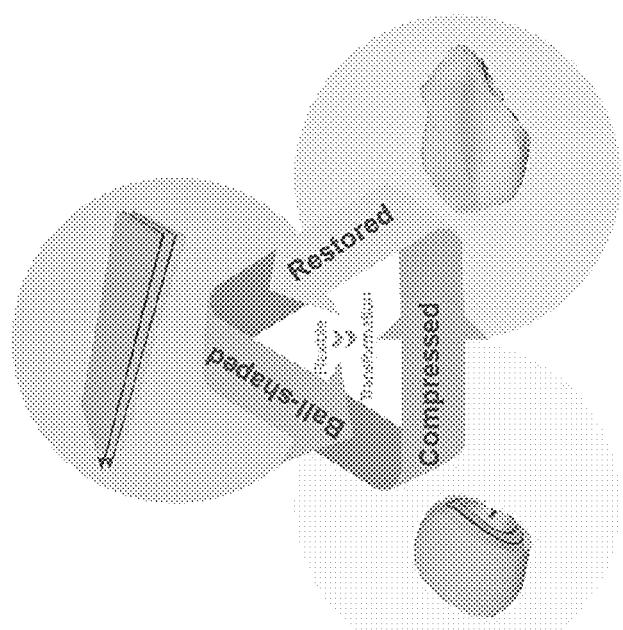
FIG. 16A is a schematic representation illustrating the dramatic deformation process of the Zn—$MnO_2$ battery of FIG. 11.
Figure 16C:
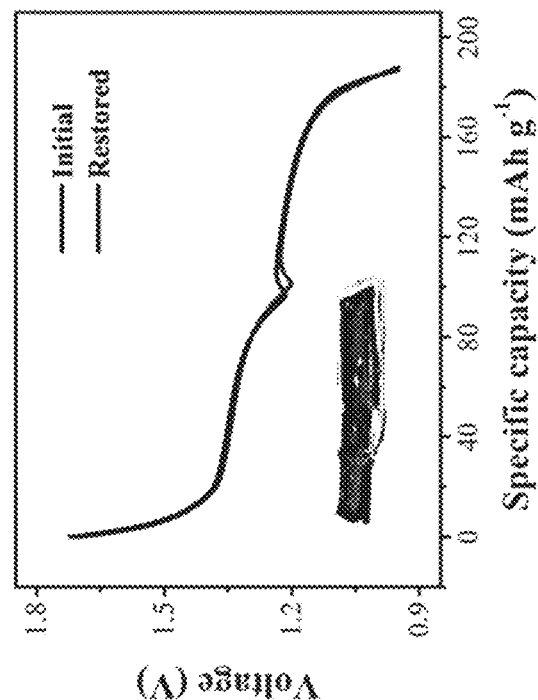
FIG. 16C is a plot of voltage against specific capacity showing the discharge curve of the Zn—$MnO_2$ battery of FIG. 11 in the state of a compressed ball. The insert is an optical image showing the battery in the state of a compressed ball.
Figure 16D:
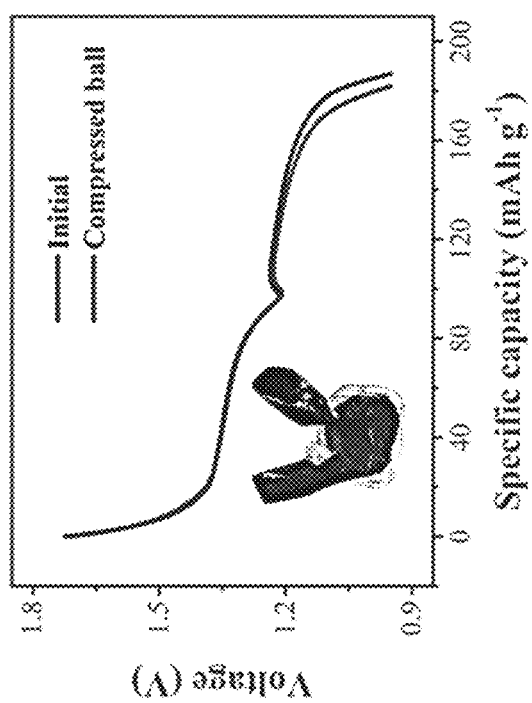
FIG. 16D is a plot of voltage against specific capacity showing the discharge curve of the Zn—$MnO_2$ battery of FIG. 11 after it is restored to its initial configuration.
Figure 17A:
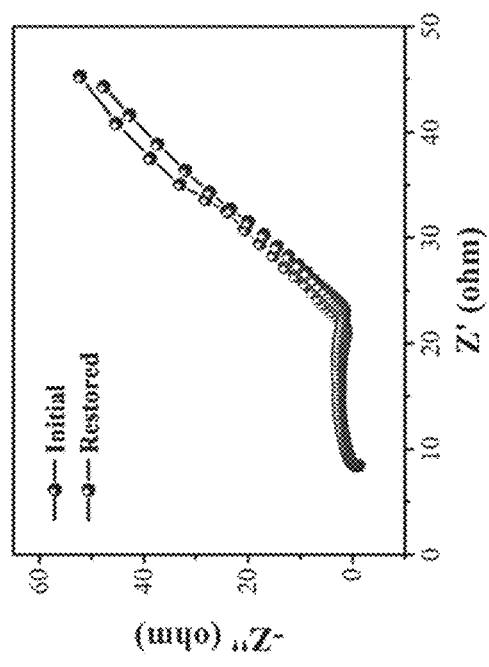
FIG. 17A is a plot showing the EIS comparison of the Zn—$MnO_2$ battery of FIG. 11 between the initial state and after the restoration state.
Figure 17B:
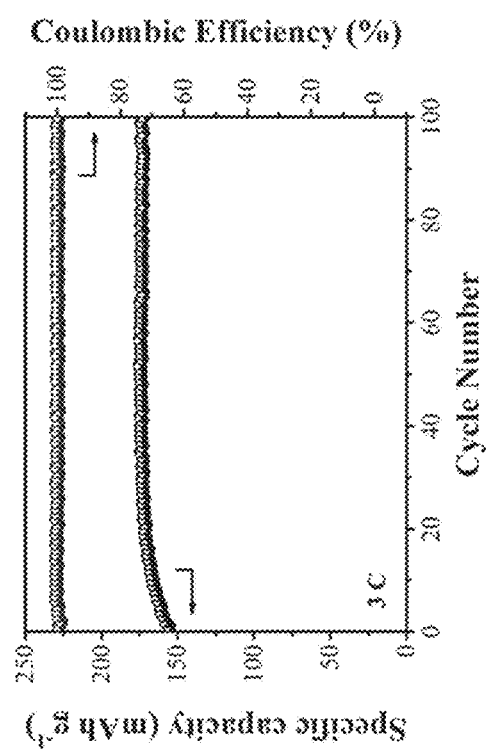
FIG. 17B is a plot showing the cycle performance of the Zn—$MnO_2$ battery of FIG. 11 after dynamic deformation at 0.924 A g$^{-1}$ (3C rate).

As an example, a sandwich-structured Zn—MnO$_2$ battery was kneaded into a ball shape like a gum, the ball-shaped battery was then flattened into a compressed ball, followed by unfolding the compressed ball back to its initial relaxed state, as illustrated by FIG. 16A. Discharge curves at around 0.77 A g$^{-1}$ were recorded at each stage and were shown in FIGS. 16B to 16D. As shown, the curves were almost identical to the initial discharge curves, indicating that these dramatic deformations did not affect the battery's performances. EIS of the battery in the initial and after restored state indicated the unchanged charge transfer resistance (FIG. 17A). After restoring to relaxed state, the battery underwent long-term cycle test, exhibiting well preserved capacity after 100 charge/discharge cycles (FIG. 16B).

Figure 18A:
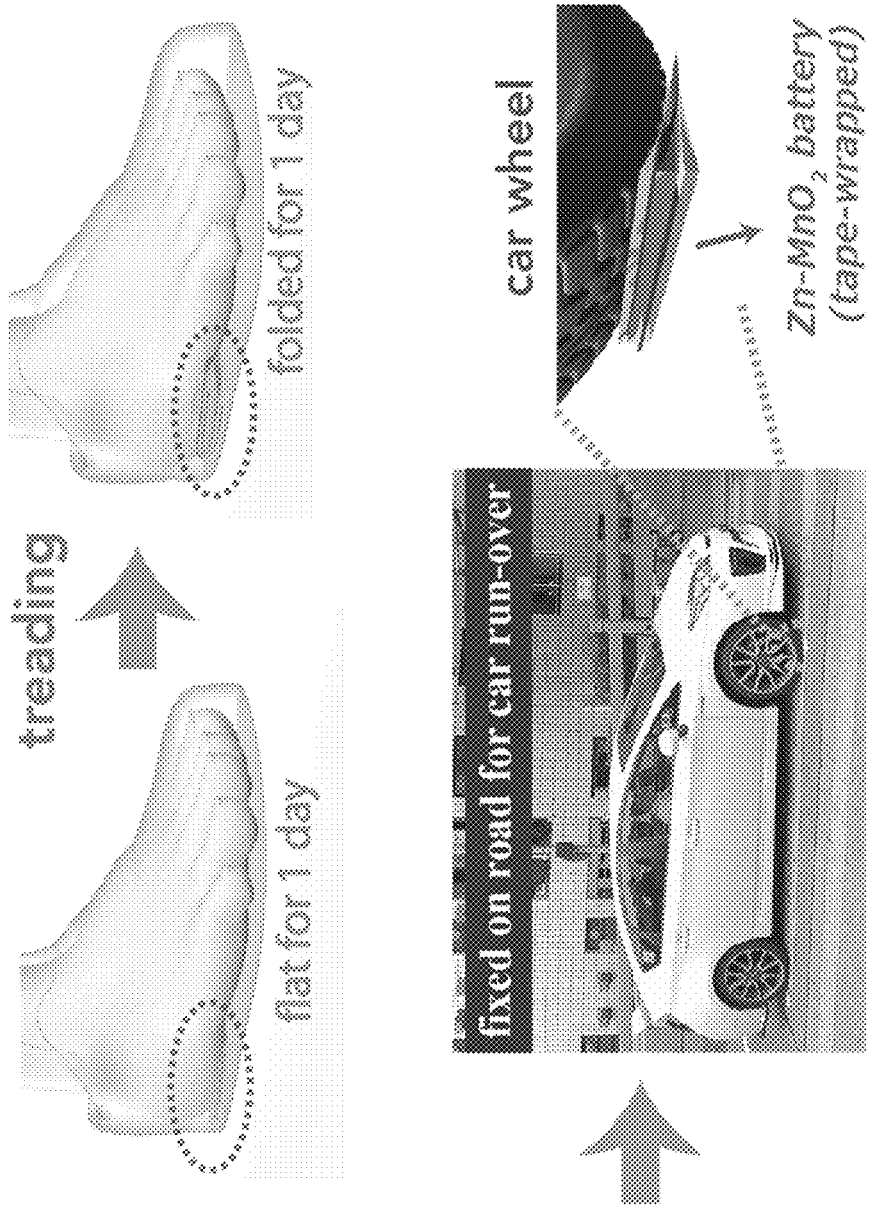
FIG. 18A is a schematic diagram illustrating the Zn—$MnO_2$ battery of FIG. 11 being placed under foot, and going through car run-over.
Figure 18B:
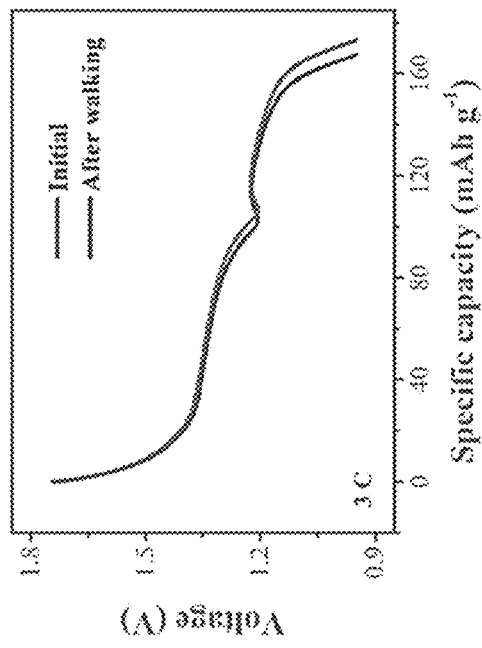
FIG. 18B is a plot of voltage against specific capacity showing the discharge curve of the Zn—$MnO_2$ battery of FIG. 11 after 2-days everyday treading, recorded at 0.924 A g$^{-1}$ (3C rate).

The toughness of flexible energy storage devices is a highly desired feature that determines the application versatility of devices. Besides the softness that enables arbitrary deformations, the Zn—MnO$_2$ battery 1100 also possesses high toughness due to the enhanced modulus and fracture energy of the dual crosslinked hydrogel electrolyte. To demonstrate the feature of battery 1100 in this aspect, the Zn—MnO$_2$ battery (clingfilm-wrapped) was placed under foot in shoe to endure the treading pressure of daily walking. It was kept in flat shape for one day and folded shape for another day, as illustrated in FIG. 18A. Its electrochemical performances were evaluated after treading for two successive days. As shown in FIG. 18B, the specific capacitance of the battery was slightly increased after experiencing long-term treading pressure, which may be ascribed to the further wetting of electrodes by the hydrogel electrolyte during persistent pressure.

Figure 18C:
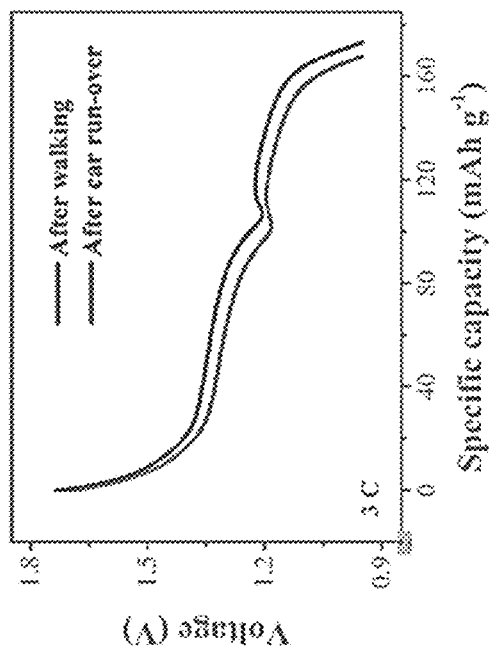
FIG. 18C is a plot of voltage against specific capacity showing the discharge curve of the Zn—$MnO_2$ battery of FIG. 11 after 20 times of random run-over by cars on road, recorded at 0.924 A g$^{-1}$ (3C rate).

The as-tested battery was fixed on road to expose it to the more catastrophic impact of car run-over (FIG. 18A). Surprisingly, the battery survived around 20 times of random run-over during its 20 minutes' exposure on road. With reference to the FIG. 18C, the electrochemical performance of the battery after being run-over by the car was highly similar to the one after walking. The slight deviation may be attributed to the micro wrinkles induced in the electrodes during repeated car run-overs that decreased the utilization of electrode materials.

Figure 19B:
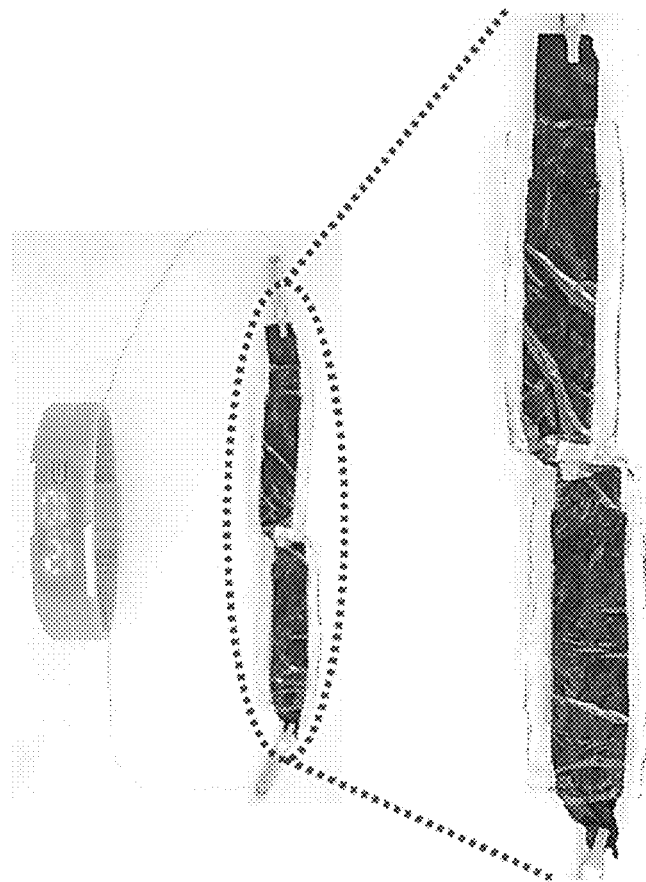
FIG. 19B is an optical image showing two Zn—$MnO_2$ batteries of FIG. 11 (clingflim-wrapped) being connected in series to power a LED wrist watch.
Figure 19A:
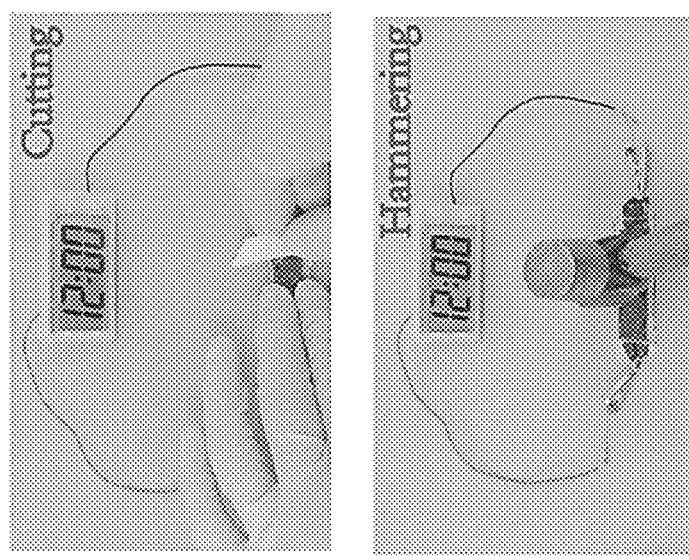
FIG. 19A is a pair of optical images showing the Zn—$MnO_2$ battery of FIG. 11 stably powering an electronic watch upon subjecting to dynamic cut and hammering.
Figure 19C:
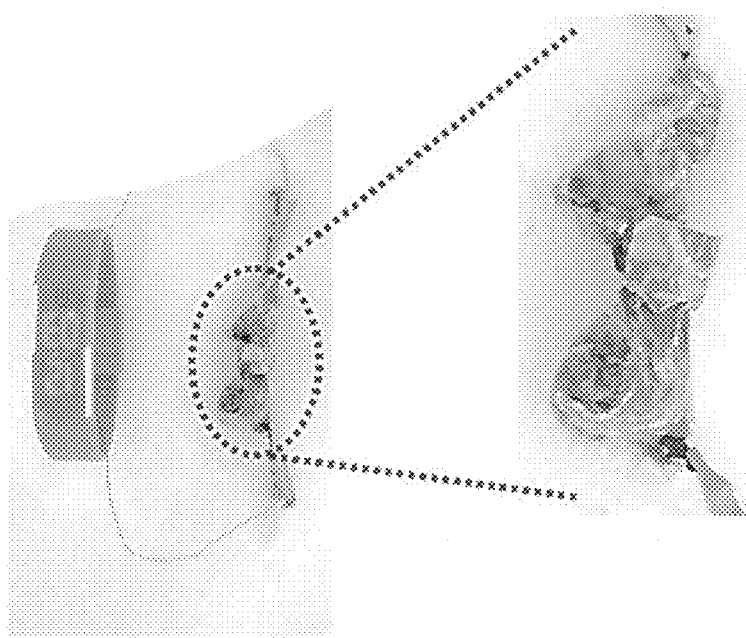
FIG. 19C is an optical image showing two Zn—$MnO_2$ batteries of FIG. 11 (clingflim-wrapped) being connected in series to power a LED wrist watch where the batteries were dramatically deformed into irregular shapes.

As shown in FIGS. 19A, the Zn—MnO$_2$ battery was used to steadily power an electronic watch while being dynamically cut and hammered, demonstrating the high toughness and dynamic stability of the Zn—MnO$_2$ battery. In addition, whilst the battery is superiorly tough, the battery was simultaneously flexible/soft. As shown in FIGS. 19B and 19C, two Zn—MnO$_2$ batteries were connected in series to power a LED wrist watch even being dramatically deformed into irregular shapes. In particular, the electronic watch was stably powered upon the battery being dynamically deformed into various irregular shapes. These unique characteristics promise the battery of the present disclosure great potential in practical flexible and wearable applications.

The energy storage device of the present invention such as the Zn—MnO$_2$ battery 1100 is advantageous since it has a high resistance to large mechanical deformations and severe mechanical stimuli including squeezing, compressing, twisting, cutting, hammering, treading, and car run-over. The device is also highly flexible/soft, rendering it arbitrarily deformable into various irregular shapes. These features further indicate the excellent wearing compatibility of the device. In addition, the battery showed stable electrochemical performance even being subjected to various mechanical stimuli as mentioned above.

The battery shows good electrochemical performance including a high specific capacity of 300.4 mAh g$^{-1}$ at 0.11 A g$^{-1}$ and 82% capacity retention after 500 charge-discharge cycles at 0.88 A g$^{-1}$. Furthermore, the scaling up of the device is very cost effective as it does not require a water-free and/or oxygen-free environment for assembling the battery.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical energy storage device, comprising:
   an anode comprising zinc metal and a cathode comprising MnO$_2$, the anode and the cathode being spaced apart from each other;
   a polymer electrolyte disposed between the anode and the cathode, the polymer electrolyte comprising a polymer matrix including at least two, first and second crosslinked structures, having a first polymeric material comprising polyacrylamide and a second polymeric material comprising alginate, respectively;
   wherein the amount of the first polymeric material is at least 5% by weight of the total amount of the polymer electrolyte, and wherein the amount of the second polymeric material is at least 0.5% by weight of the total amount of the polymer electrolyte;
      the first crosslinked structure is defined by a plurality of polymer chains of the first polymeric material that form a covalent crosslink between each adjacent pair of polymer chains of the first polymeric material, and the second crosslinked structure is defined by a plurality of polymer chains of the second polymeric material that form an ionic crosslink between at least one adjacent polymer chain of the second polymeric material;
      an electrolytic solution retained by the polymer matrix; and
      at least one protective layer disposed on at least one of the anode and the cathode, opposite the polymer electrolyte, the at least one protective layer comprising the first polymeric material and the second polymeric material, and including the at least two, first and second crosslinked structures;
      wherein the polymer electrolyte and the at least one protective layer are arranged to dissipate mechanical energy together when subjected to an external mechanical load applied to the electrical energy storage device.

2. The electrical energy storage device according to claim 1, wherein the covalent crosslink is formed by at least one covalent bond between the adjacent pair of polymer chains of the first polymeric material via a first crosslinking agent comprising N,N'-methylenebisacrylamide.

3. The electrical energy storage device according to claim 1, wherein the ionic crosslink is formed by at least one ionic bond between the adjacent pair of polymer chains of the second polymeric material via a second crosslinking agent comprising a cation.

4. The electrical energy storage device according to claim 1, wherein the at least two crosslinked structures form a third crosslinked structure including at least one physical crosslink, which includes intercrossing and intertwining connections formed between adjacent pairs of polymer chains of the first and the second polymeric materials.

5. The electrical energy storage device according to claim 1, wherein the anode further includes a substrate on which the zinc metal deposited.

6. The electrical energy storage device according to claim 1, wherein the cathode further includes a substrate on which $MnO_2$ is deposited.

7. The electrical energy storage device according to claim 5, wherein the substrate is selected from the group consisting of carbon nanotube paper, carbon cloth, carbon paper, nickel foam, and steel sheet.

8. The electrical energy storage device according to claim 1, wherein the $MnO_2$ in the cathode includes $\alpha\text{-}MnO_2$.

9. The electrical energy storage device according to claim 1, wherein the electrolytic solution includes at least one salt or acid having a concentration of 0.1-3 M.

10. The electrical energy storage device according to claim 1, wherein the covalently crosslinked structure dissipates energy by elastic deformation when subjected to external mechanical load thereby maintaining the integrity of the electrolyte.

11. The electrical energy storage device according to claim 1, wherein the ionically crosslinked structure dissipates energy by rupturing bonds within the structure when subjected to external mechanical load; and restoring the bonds when the external mechanical load is removed.

12. The electrical energy storage device according to claim 1, wherein the electrical energy storage device is a rechargeable battery.

* * * * *